US009335423B2

(12) United States Patent
Bolotnikov et al.

(10) Patent No.: US 9,335,423 B2
(45) Date of Patent: May 10, 2016

(54) RADIATION DETECTOR DEVICE FOR REJECTING AND EXCLUDING INCOMPLETE CHARGE COLLECTION EVENTS

(75) Inventors: Aleksey E. Bolotnikov, South Setauket, NY (US); Gianluigi De Geronimo, Syosset, NY (US); Emerson Vernon, Ridge, NY (US); Ge Yang, Moriches, NY (US); Giuseppe Camarda, Shoreham, NY (US); Yonggang Cui, Miller Place, NY (US); Anwar Hossain, Port Jefferson Station, NY (US); Ki Hyun Kim, Gwangju-si (KR); Ralph B. James, Ridge, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 304 days.

(21) Appl. No.: 14/129,091

(22) PCT Filed: Jun. 29, 2012

(86) PCT No.: PCT/US2012/044982
§ 371 (c)(1),
(2), (4) Date: May 2, 2014

(87) PCT Pub. No.: WO2013/006453
PCT Pub. Date: Jan. 10, 2013

(65) Prior Publication Data
US 2014/0231657 A1    Aug. 21, 2014

Related U.S. Application Data

(60) Provisional application No. 61/503,913, filed on Jul. 1, 2011.

(51) Int. Cl.
*G01T 1/17*    (2006.01)
*G01T 1/24*    (2006.01)

(52) U.S. Cl.
CPC .. *G01T 1/17* (2013.01); *G01T 1/247* (2013.01)

(58) Field of Classification Search
CPC ............. G01T 1/17; G01T 1/24; G01T 1/241; G01T 1/247
See application file for complete search history.

(56) References Cited

U.S. PATENT DOCUMENTS

| 5,530,249 A | 6/1996 | Luke |
| 6,046,454 A | 4/2000 | Lingren et al. |

(Continued)

FOREIGN PATENT DOCUMENTS

SU    1264723 A1    9/1990

OTHER PUBLICATIONS

Knoll, G., "The Shockley-Ramo Theorem for Induced Charge", Radiation Detection and Measurement, 2000, 9 pages, Wiley.

(Continued)

*Primary Examiner* — Casey Bryant
(74) *Attorney, Agent, or Firm* — Dorene M. Price

(57) ABSTRACT

A radiation detector device is provided that is capable of distinguishing between full charge collection (FCC) events and incomplete charge collection (ICC) events based upon a correlation value comparison algorithm that compares correlation values calculated for individually sensed radiation detection events with a calibrated FCC event correlation function. The calibrated FCC event correlation function serves as a reference curve utilized by a correlation value comparison algorithm to determine whether a sensed radiation detection event fits the profile of the FCC event correlation function within the noise tolerances of the radiation detector device. If the radiation detection event is determined to be an ICC event, then the spectrum for the ICC event is rejected and excluded from inclusion in the radiation detector device spectral analyses. The radiation detector device also can calculate a performance factor to determine the efficacy of distinguishing between FCC and ICC events.

47 Claims, 17 Drawing Sheets

(56) References Cited

U.S. PATENT DOCUMENTS

| | | | |
|---|---|---|---|
| 6,175,120 | B1 | 1/2001 | McGregor |
| 6,781,132 | B2 | 8/2004 | McGregor |
| 7,223,982 | B1 | 5/2007 | Chen et al. |
| 2009/0026371 | A1 | 1/2009 | Bolotnikov et al. |

OTHER PUBLICATIONS

Bolotnikov, A. E. et al., "Optimization of virtual Frisch-grid CdZnTe detector designs for imaging and spectroscopy of gamma rays", Invited Paper, in Proceedings of SPIE Hard X-Ray and Gamma-Ray Detector Physics VIII, 2007,15 pages, vol. 6702.

Bolotnikov, A. E. et al., Performance Characteristics of Frisch-Transactions on Nuclear Science, 2006, pp. 607-614, vol. 53 (2).

Barrett, H.H., J. D. Eskin, and H. B. Barber, Charge Transport in Arrays of Semiconductor Gamma-Ray Detectors, Phys. Rev. Lett., 1995, p. 156-159, 75 (1).

Montemont, G., M. Argues, L. Verger, and J. Rustique, "A Capacitive Frisch Grid Structure for CdZnTe Detectors", IEEE Trans. Nucl. Sci., 2001, pp. 278-281, vol. 48.

Cui, Y., et al., "CZT Virtual Frisch-grid Detector: Principles and Applications," presented at the Fifth Annual IEEE Long Island Systems, Applications and Technology Conference, pp. 1-9, (Farmingdale, New York, May 1, 2009).

Szeles, C. et al., "Fabrication of High Performance CdZnTe Quasi-Hemispherical Gamma-ray CAPtureTM Plus Detectors", Hard X-Ray and Gamma-Ray Detector Physics VIII, edited by Larry A. Franks, Arnold Burger, and Ralph B. James, Proceedings of SPIE vol. 6319, 2006, 9 pages.

K. Parnham, C. Szeles, K.G. Lynn, and R. Tjossem, "Performance Improvement of Cd7,nTe Detectors Using Modified Two-Terminal Electrode Geometry," accepted for publication in Hard x-ray, Gamma-Ray and Neutron Detector Physics, Proceedings of SPIE, 1999, 6 pages.

Eisen, Y., et al., "Correction of incomplete charge collection in CdTe detectors," Nuclear Instruments and Methods in Physics Research A, vol. 353, pp. 60-66, (1994).

Bolotnikov, A. et al., "Effects of Te inclusions on the performance of CdZnTe radiation detectors," 2007 IEEE Transactions on Nuclear Science, vol. 51, No. 5, pp. 2757-2764, (2008).

Luke, P., et al., "Single-polarity charge sensing in ionization detectors using coplanar electrodes," Applied Physics Letters, vol. 65, No. 22, pp. 2884 to 2886, (1994).

Schockley, W., "Currents to conductors induced by a moving point charge," Journal of Applied Physics, vol. 9, pp. 635-636, (1938).

Ramo, S., "Currents induced by electron motion," Proceedings of the I.R.E., vol. 27, pp. 584-585, (1939).

Bolotnikov, A., et al. "Array of Virtual Frisch-grid CZT Detectors with Common Cathode Readout and Pulse Height Correction," Proceedings of SPIE vol. 7805, 12 pages (2010).

Bolotnikov, A., et al. "Performance Studies of CdZnTe Detector by Using a Pulse Shape Analysis," presented at: Penetrating Radiation Systems and Applications VII, pp. 1-12, (SPIE, San Diego, CA, Jul. 31-Aug. 4, 2005).

International Search Report of International Application PCT/US2012/044982—Date mailed: Dec. 12, 2012, 2 pages.

Written Opinion of the Searching Authority of International Application No. PCT/US2012/044982—Date mailed: Dec. 12, 2012, 5 pages.

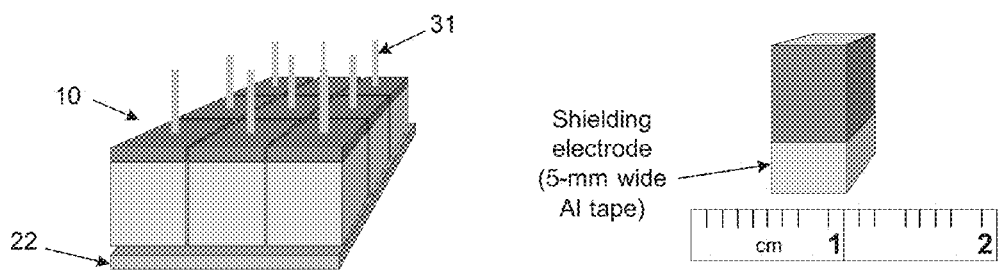
FIG. 2A
FIG. 2B
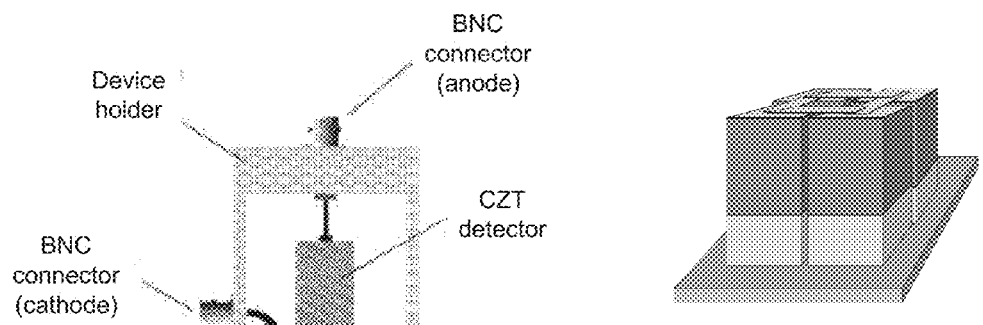
FIG. 2D
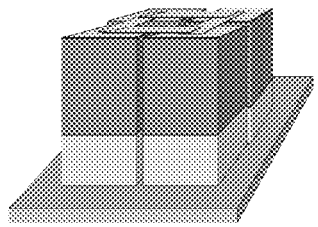
FIG. 2C

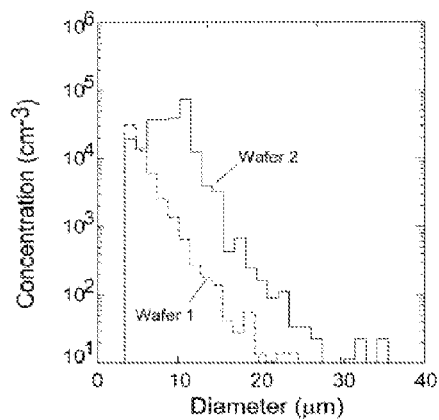
FIG. 4A
FIG. 4B
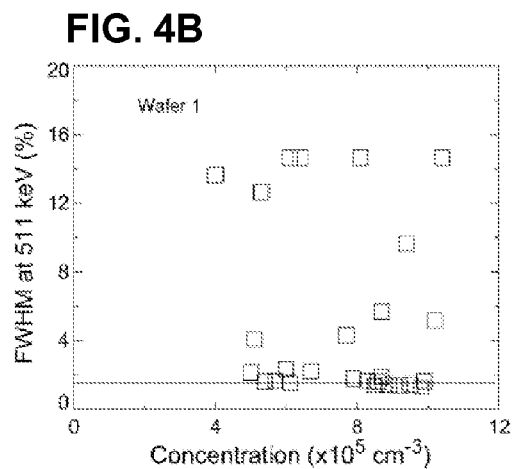
FIG. 4C
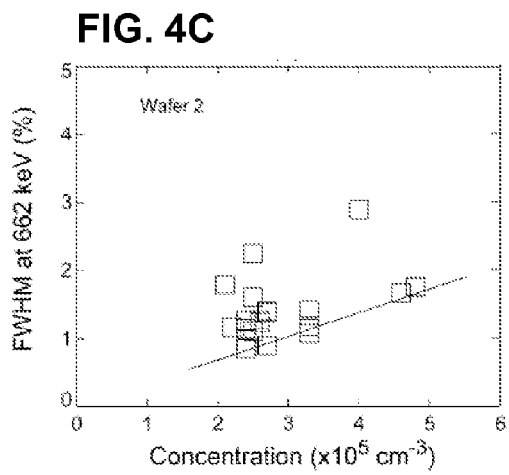
FIG. 4D
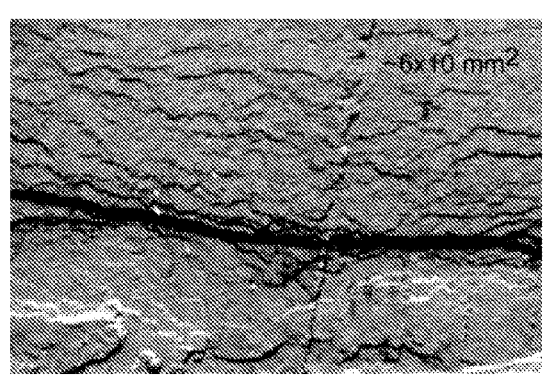
FIG. 4E
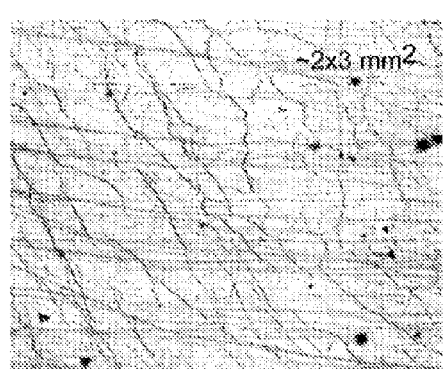

RADIATION DETECTOR DEVICE FOR REJECTING AND EXCLUDING INCOMPLETE CHARGE COLLECTION EVENTS

CROSS-REFERENCE TO A RELATED APPLICATION

This application is a 371 of International Application No. PCT/US2012/044982 filed Jun. 29, 2012, which in turn claims priority to Provisional Application No. 61/503,913 filed Jul. 1, 2011, the entirety of both are hereby incorporated by reference.

STATEMENT OF GOVERNMENT LICENSE RIGHTS

The present invention was made with government support under contract number DE-AC02-98CH10886 awarded by the U.S. Department of Energy. The United States government may have certain rights in this invention.

FIELD OF THE INVENTION

The present invention relates to the field of radiation imaging. In particular, the present invention relates to an algorithm for detection and rejection of incomplete charge collection events.

BACKGROUND

Development of nuclear radiation detectors for electromagnetic radiation such as X-rays and gamma-rays using gases, liquids and semiconductors, such as CdTe, CdZnTe (CZT), $HgI_2$, TlBr, and others, currently underway in the National Laboratories, universities, and industry, is vital for many applications including medical imaging, astronomy, and homeland security.

Signals from radiation detectors arise due to motion of charge carriers after they are formed by incident radiation. This statement applies equally to gas-filled ion chambers, proportional counters, and semiconductor detectors, such silicon diodes and germanium spectrometers.

As soon as the incident radiation interacts with the detector material and charge carriers begin to move toward the electrodes, the output pulse starts to form. There is no delay before pulse onset due to carrier time of transport from their point of formation to the collecting electrode. When the carriers are created in a radiation interaction event they are collected at an electrode and the charge induction process ceases.

In semiconductor radiation detectors, defects and impurities in the crystal lattice tend to trap charge carriers. Crystal defects are the major factor limiting the performance of today's room-temperature semiconductor detectors, such as CdTe, CdZnTe, TlBr, and $HgI_2$. Crystal defects that trap carriers lead to incomplete charge collection (ICC) and dead areas in detectors that inhibit device efficiency and energy spectral responses. Also, defects degrade the yield of the big crystals acceptable for device fabrication.

The specific effects of ICC events on the detector response (pulse-height spectra) depend on the amount of lost charge and the distribution of defects within the crystals. Some defects, e.g., Te inclusions, cause small fluctuations of collected charge, degrading device energy resolution. In contrast, some flaws, e.g., subgrain boundaries, entail significant charge loss that moves events from a photopeak area to a spectra's continuum, thereby lowering device photo efficiency and reducing the peak-to-Compton ratio.

One straightforward solution to these ICC problems is to grow large, high-purity, defect-free semiconductor crystals and to use specially selected crystal cuts with low concentrations of small defects and impurities. Producing such semiconductor crystal detectors is typically a time and energy intensive as well as a cost prohibitive proposition, which limits the viability of any business model.

Although this approach is acceptable for small detectors, it is too expensive when large, >10 $cm^3$, crystals must be used. The probability of large crystals having acceptable levels of defects throughout is very low, while their cost is high. Therefore, the method more likely of success is to exploit the commercially available imperfect semiconductor crystals in some manner to improve their performance.

Electronically rectifying distortion in detector energy spectra related to the ICC events caused by the point defects is known at least as far back as 1994. In the Nuclear Instruments and Methods in Physics Research A article "Correction of incomplete charge collection in CdTe Detectors," Eisen and Horovitz describe a theoretical function for correcting the ICC by correlating the charge collected with the position of interaction. Monte Carlo methods, genetic algorithms, rise time discrimination (RTD), and other methods have also been used to compensate for ICC effects on measured detector energy spectra. However, the ICC events caused by big extended defects and contributing to the spectra's continuums could not be corrected by these approaches.

SUMMARY

A more general solution to the problems posed by ICC events is to recognize and reject ICC events caused by crystal defects, while retaining full-charge collection (FCC) events in detector energy spectral responses. Such a rejection algorithm is possible in any single-polarity carrier device in which the amplitudes of signals read out from the cathode and anode(s) must be correlated with electron drift time(s). Any function representing such a correlation can be used to distinguish between FCC- and ICC-events.

ICC rejection primarily deals with ICC events resulting from charge carrier trapping by defects such as Te inclusions and subgrain boundaries and dislocations. Rejection of ICC events does not result in any further loss of detection photoefficiency since ICC events do not contribute to the photopeak. However, rejecting ICC events can significantly improve the spectral response (energy resolution, peak-to-Compton ratio) and enhance overall detection sensitivity of devices fabricated from crystals with relaxed quality requirements. Such crystals are currently available from vendors.

In multi-anode detectors, e.g., pixilated ones, ICC events can be mimicked by charge-sharing between several anodes or multiple interactions due to Compton scattering. In such cases, the cathode still will collect the full charge, while the individual anodes will collect a fraction of the charge resembling the ICC event caused by the defects.

The present radiation detector device includes at least one radiation detector element configured to generate electrical charges in response to radiation interacting with a detector material.

The radiation detector device also includes at least one anode connected to the at least one radiation detector element and configured to output electrical signals from the radiation detector material corresponding to the generated electrical charges. The radiation detector device further includes at least one shared cathode connected to one or more of the at least one radiation detector elements and configured to output electrical signals from the radiation detector material corresponding to generated electrical charges.

A specialized radiation detector readout chip (SRDC) is connected to the at least one anode and connected to the at least one shared cathode, wherein the SRDC is configured to receive electrical signals, sense parameters of the received electrical signals, and output the sensed electrical signal parameters.

The radiation detector device further includes a non-transitory computer readable storage medium storing a full charge collection (FCC) event correlation function and instructions for performing a correlation value comparison algorithm utilizing the FCC event correlation function as a reference curve to determine whether correlation values calculated for the sensed electrical signal parameters fit a FCC correlation function profile.

Additionally, the radiation detector device incorporates a processor that is connected to the non-transitory computer readable storage medium and to the SRDC, wherein the processor is configured to receive the sensed electrical signal parameters, calculate correlation values for the sensed electrical signal parameters, and execute the instructions for performing the correlation value comparison algorithm.

In an embodiment a result of the correlation value comparison algorithm distinguishes between FCC events and ICC events, and a further result of the correlation value comparison algorithm includes rejection of electrical signal events determined to correspond to ICC events from inclusion in radiation detector spectral analyses.

A method is also disclosed for evaluating charge collection events in a radiation detector. This method includes generating electrical charges in at least one radiation detector element in response to radiation interacting with a detector material, outputting electrical signals corresponding to the generated electrical charges from the at least one radiation detector element by at least one anode connected to the at least one radiation detector element, and outputting electrical signals corresponding to the generated electrical charges from the at least one radiation detector element by at least one shared cathode connected to one or more of the at least one radiation detector elements.

The method further includes receiving the electrical signals by a specialized radiation detector chip (SRDC) connected to the at least one anode and connected to the at least one shared cathode, sensing parameters of the received electrical signals by the SRDC, and outputting the sensed electrical signal parameters by the SRDC.

Additionally, the method includes receiving at a processor connected to the SRDC the sensed electrical signal parameters, calculating by the process correlation values for the sensed electrical signal parameters (signals' amplitudes and drift times), and executing by the processor, based on instructions for performing a correlation value comparison algorithm and a full charge collection (FCC) event correlation function stored in a non-transitory computer readable storage medium connected to the processor, the correlation value comparison algorithm utilizing the FCC event correlation function as a reference curve to determine whether the correlation values fit a FCC event correlation function profile.

The objectives, features and advantages of the present invention will be apparent from the following detailed description of the invention, which is to be read in conjunction with the accompanying drawings. The scope of the invention will be pointed out in the claims. The following drawings, taken in conjunction with the subsequent description, are presented to enable one of ordinary skill in the art to make and use the invention and to implement it in the context of particular applications.

Various modifications, as well as a variety of uses in different applications, will be readily apparent to those skilled in the art, and the general principles, defined herein, may be applied to a wide range of embodiments. Thus, the present invention is not intended to be limited to the embodiments presented, but is to be accorded the widest scope consistent with the principles and novel features disclosed herein. Furthermore, it should be noted that unless explicitly stated otherwise, the figures included herein are illustrated schematically and without any specific scale, as they are provided as qualitative illustrations of the concept of the present invention.

DESCRIPTION OF THE DRAWINGS

FIG. 2A is a photograph of an assembled detector array module.

FIG. 2B is a photograph of a 6×6×15 $cm^3$ virtual Frisch-grid detector encapsulated in a 100-μm thin polyester shell with a 5-mm wide shielding electrode.

FIG. 2C is a photograph of a 3D-ASIC compatible interposing substrate supporting four detectors of FIG. 2B with interconnected cathodes.

FIG. 2D is a schematic drawing of the device holder with two BNC connectors.

FIG. 4A is a plot showing a typical size distributions of Te inclusions found in the samples cut from two wafers.

FIGS. 4B and 4C are plots that show correlation between energy resolution and concentration of Te inclusions with diameters greater than 3 mm measured for the crystals cut from wafer #1 (FIG. 4B) and wafer #2 (FIG. 4C).

FIG. 4D is white X-Ray Beam Diffraction Topography (WXDT) image of a large subgrain boundary along a network of small dislocation bands FIG. 4E is an X-Ray Beam Diffraction Topography (WXDT) image of the etched surface revealing walls of dislocations.

DETAILED DESCRIPTION

Figure 1A:
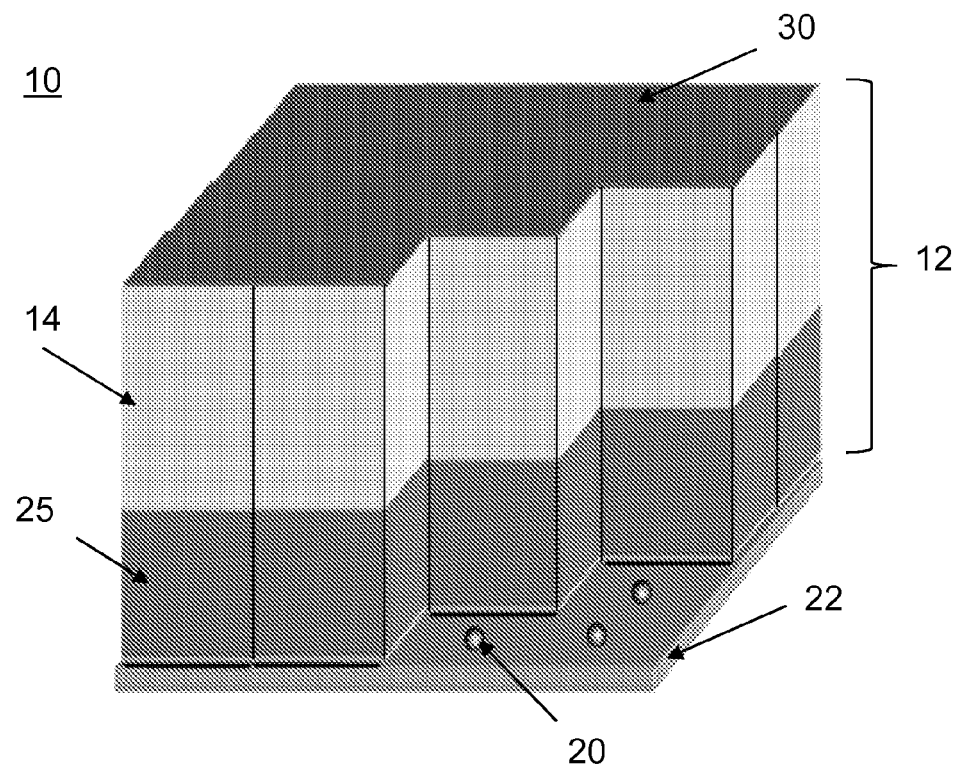
FIG. 1A is a schematic drawing of 4×4 detector array module having a common cathode, plurality of anodes and a ceramic substrate. Aluminum shielding tape provides the virtual Frisch-grid effect.
Figure 1B:
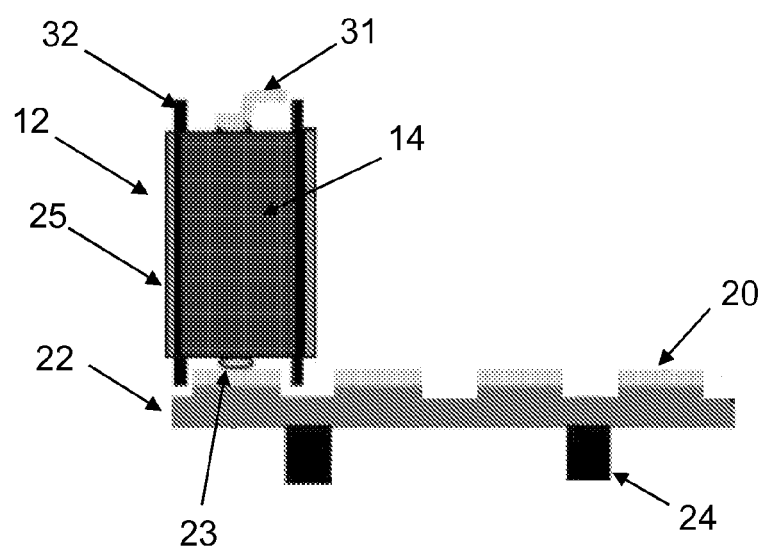
FIG. 1B is a cross sectional view of a detector array module with one detector shown connected to the printed circuit board substrate.
Figure 3A:
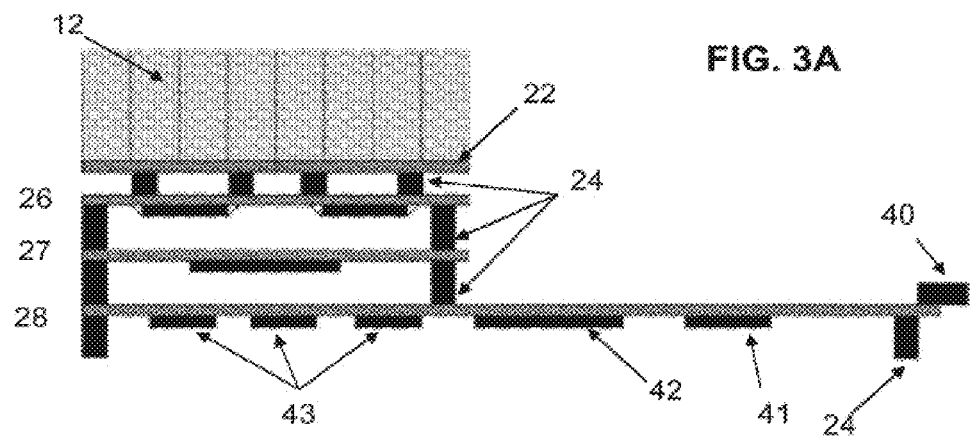
FIG. 3A is a schematic drawing of a radiation detector device showing the detector array module connected to various printed circuit boards embodying the various different functionalities of the radiation detector device.
Figure 3B:
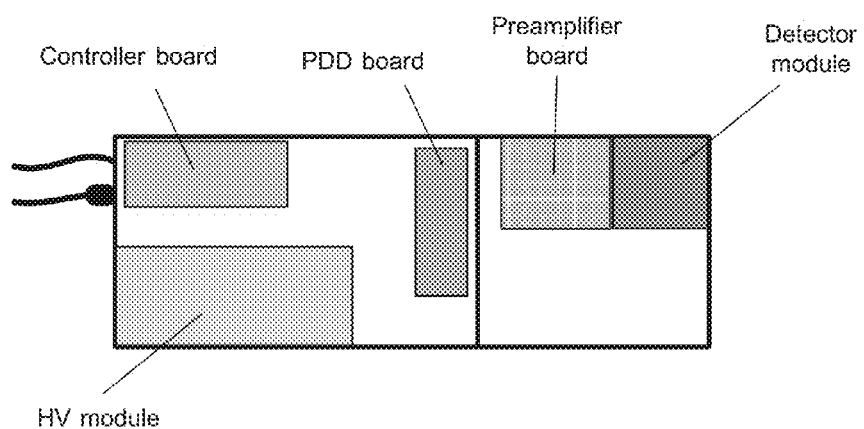
FIG. 3B is a photograph of an assembled radiation detector device.

The present radiation detector device 10, includes at least one radiation detector element 12 configured to generate electrical charges in response to radiation interacting with a detector material 14. The at least one radiation detector element may comprise a plurality of radiation detector elements 12 assembled to construct a detector array module, as depicted in FIG. 1A and as shown in the photograph of FIG. 2A. FIG. 1B and FIG. 3A also depict schematics of the detector array module and the radiation detector device 10. As shown in FIG. 3A, the radiation detector device may include a USB connector 40 and one or more printed circuit boards, including a preamplifier board 26, a peak detection board 27, and a controller board 28. FIG. 3B shows a photograph of an assembled radiation detector device 10.

The radiation detector device 10 may include a semiconductor detector material 14. The semiconductor detector material 14 may include a doped semiconductor and/or multiple different semiconductor materials or compounds. Exemplary semiconductor materials include silicon (Si), germanium (Ge), silicon-germanium ($Si_{1-x}Ge_x$, wherein x is greater than 0 and less than 1), silicon carbide (SiC), cadmium telluride (CdTe) cadmium zinc telluride (CdZnTe), CdMnTe, $HgI_2$, TlBr, HgCdTe, HgZnSe, GaAs, $PbI_2$, AlSb, InP, ZnSe, ZnTe, PbO, $BiI_3$, SiC, $Hg_xBr_{1-x}I_2$, $Hg_xCd_{1-x}I_2$, wherein x is greater than 0 and less than 1, $InI_2$, $Ga_2Se_3$, $Ga_2Te_3$, $TlPbI_3$, $Tl_4HgI_6$, $Tl_3As_2Se_3$, $TlGaSe_2$, or $AgGaTe_2$.

Furthermore, in alternative detector devices, the detector material 14 may comprise a metallic element, a liquid, a gas, a noble gas, or a halogen gas. Exemplary noble gases include Xe, Ar, or Kr.

The at least one radiation detector element 12 of the radiation detector device 10, may be configured to detect electromagnetic radiation, such as ionizing radiation, including ultraviolet, X-ray, and gamma-ray energy frequencies, charged particle radiation, such as protons, electrons, alpha particle, beta particle, and ion particle radiation, or neutral particle radiation, such as neutron radiation and neutral atomic particle radiation.

The radiation detector device 10 also includes at least one anode 20 connected to the at least one radiation detector element 12 and configured to output electrical signals from the radiation detector material 14 corresponding to generated electrical charges. The at least one anode 20 may be mounted on a substrate 22, such as a ceramic substrate or a substrate made of any appropriate material known in the art. For example, the radiation detector element 12 may be mounted on the substrate 22 using conductive epoxy 23 attached on a gold plated anode pad 20.

The radiation detector device 10 further includes at least one shared cathode 30 connected via HV connection 31 to one or more of the at least one radiation detector elements 12 and configured to output electrical signals from the radiation detector material 14 corresponding to generated electrical charges.

Additionally, the at least one radiation detector element 12 may include a shielding electrode 25 covering some portion of the detector material 14, such as any appropriate type of shielding electrode known in the art. The shielding electrode 25 is typically isolated from the detector material 14 and/or the anode 20 and cathode 30 by an insulator material 32, for example as depicted in FIG. 3 between the Frisch-ring shielding electrode 25 and the CZT detector material 14, such as a polyester shell as shown in FIG. 2B.

The radiation detector device further includes a specialized radiation detector chip (SRDC) (41, 42, 43), which comprises an integrated circuit, which may specifically include application specific integrated chips (ASICs) 43, field programmable gate arrays (FPGAs) 42, complex programmable logic devices (CPLDs) 41, and other similar types of circuits and chips.

A specialized radiation detector chip (SRDC) is connected to the at least one anode 20 and to the at least one shared cathode 30, either directly or indirectly through one or more printed circuit boards (26, 27, 28) via connectors 24. The SRDC is configured to receive electrical signals, sense parameters of received electrical signals, including amplitude and timing parameters, and output sensed electrical signal parameters.

The radiation detector device further includes a non-transitory computer readable storage medium storing a full charge collection (FCC) event correlation function and instructions to perform a correlation value comparison algorithm utilizing the FCC event correlation function as a reference curve to determine whether values for sensed electrical signal parameters fit a FCC correlation function profile.

Additionally, the radiation detector device incorporates a processor that is connected to the non-transitory computer readable storage medium and to the SRDC, wherein the processor is configured to receive sensed electrical signal parameters, calculate correlation values for the sensed electrical signal parameters, and to execute the instructions for performing the correlation value comparison algorithm. The processor is configured to calculate correlation values for sensed electrical signal parameters based on a weighting potential function, $\phi_0$, as determined by solving the Laplace equation for the particular device geometry and configuration, as detailed in the description below.

Either and/or both the processor and the non-transitory computer readable medium may be implemented within the SRDC. Alternatively, the SRDC, the non-transitory computer readable medium, and the processor, can all connect to each other through one or more printed circuit boards.

In the detector device, a result of the correlation value comparison algorithm distinguishes between FCC events and Incomplete Charge Collection (ICC) events, and a further result of the correlation value comparison algorithm may include rejection of electrical signal events determined to correspond to ICC events. Rejection of electrical signal events distinguished as ICC events results in exclusion of those ICC events from radiation detector spectral analyses.

The FCC event correlation function may be calibrated using one or more known radiation sources and pre-loaded in the non-transitory computer readable storage medium. The FCC event correlation function describes a statistically averaged reference curve relating ratios of FCC event cathode electrical signal amplitudes to FCC event anode electrical signal amplitudes and a timing parameter, such as electron cloud drift time.

Figure 8:
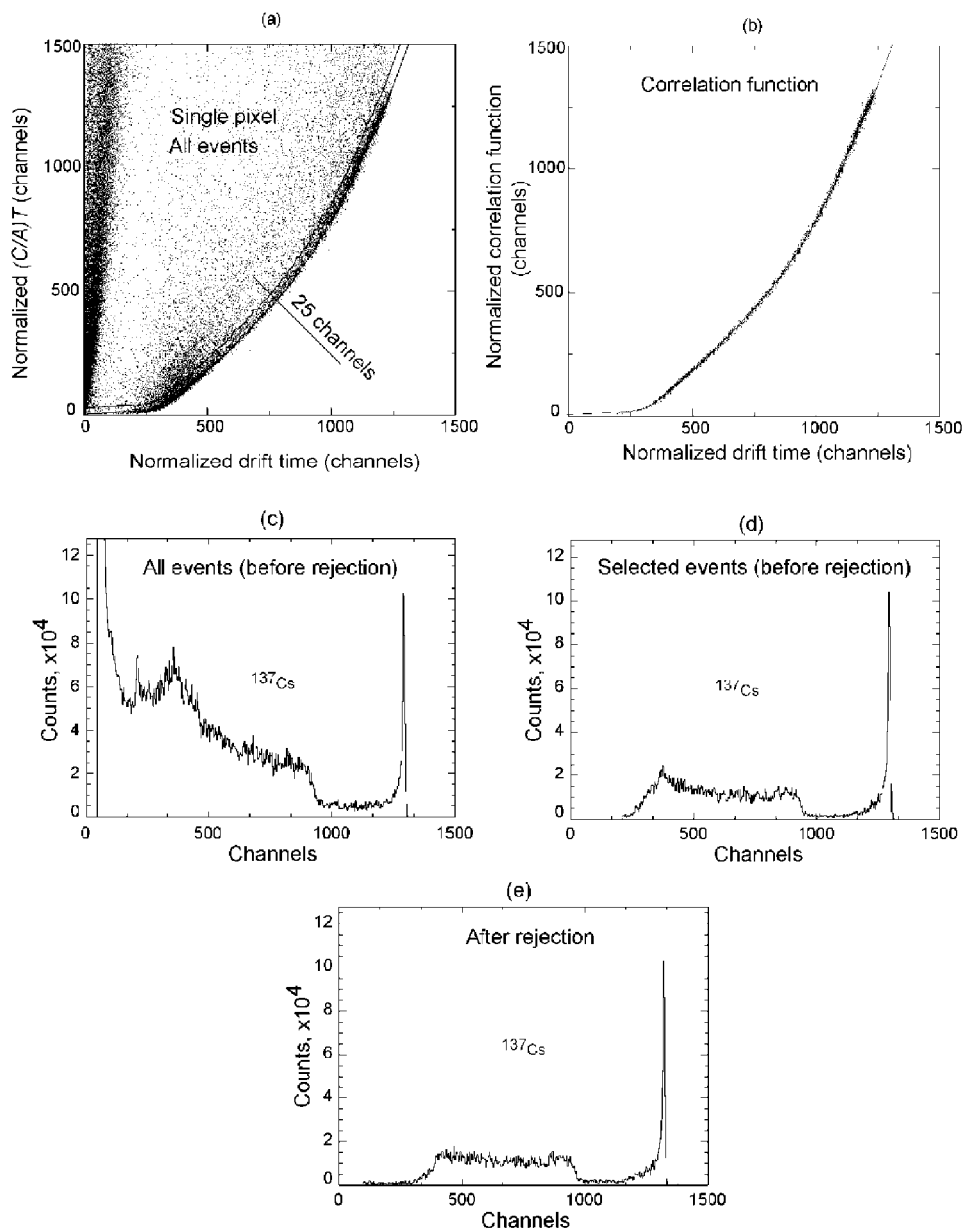
FIG. 8 are plots, which illustrate (a) a distribution of $(A_{cathode}/A_{Anode})(T_{Drift})$ vs. $T_{Drift}$ plotted for all events; (b) a correlation function evaluated by selecting the photoabsorption events; (c) a pulse-height spectrum evaluated for all events; (d) a pulse-height spectrum evaluated for the true single-pixel events; and (e) a pulse-height spectrum evaluated for all events after rejection.

Correlation values for the electrical signal parameters that occur along the reference curve of the FCC event correlation function within a narrow band representative of electronic noise, as shown in FIGS. 8A and 10C, are distinguished as corresponding to an FCC event. And, the correlation values that occur outside the narrow band representative of electronic noise with respect to the reference curve of the FCC event correlation function are distinguished as corresponding to Incomplete Charge Collection (ICC) events.

The processor can be configured to evaluate a radiation detector performance factor based on a ratio of an average of FCC event electrical signal energy spectra to an average of electrical signal energy spectra associated with both FCC and ICC events.

A method for evaluating charge collection events in a radiation detector is also disclosed. The method includes generating electrical charges in at least one radiation detector element 12 in response to radiation interacting with a detector material 14. The electrical charges may be generated in response to electromagnetic radiation, such as ionizing radiation, including ultraviolet, X-ray, and gamma-ray energy frequencies, charged particle radiation, such as protons, electrons, alpha particle, beta particle, and ion particle radiation, or neutral particle radiation, such as neutron radiation and neutral atomic particle radiation.

Electrical signals corresponding to electrical charges generated in one or more of the at least one radiation detector elements 12 are output by at least one anode 20 connected to the at least one radiation detector element 12 and are also output by at least one shared cathode 30 connected one or more of the at least one more radiation detector elements 12. The output electrical signals are received by a specialized radiation detector chip (SRDC) (41, 42, 43) connected to the at least one anode 20 and connected to the at least one shared cathode 30.

The SRDC (41, 42, 43) senses parameters of the received electrical signals, including at least amplitude and timing parameters. Sensed electrical signal parameters are output by the SRDC and received at a processor connected to the SRDC. The processor then executes, based on instructions for performing a correlation value comparison algorithm and a full charge collection (FCC) event correlation function stored in a non-transitory computer readable storage medium connected to the processor, a correlation value comparison algorithm utilizing the FCC event correlation function as a reference curve to distinguish whether values for sensed electrical signal parameters fit a FCC event correlation function profile.

The method may further include calibrating the FCC event correlation function using one or more known radiation sources and pre-loading the FCC event correlation function in the non-transitory computer readable storage medium. The processor calculates correlation values for sensed electrical signal parameters based on a weighting potential function, $\phi_0$, as determined by solving the Laplace equation for the particular device geometry and configuration, as detailed in the description below.

Performing the correlation value comparison algorithm may further include, calculating electron cloud drift times based on electrical signal parameters measured by the SRDC, calculating a correlation value based on the electrical signal parameters measured by the SRDC that relates the ratio of the at least one shared cathode electrical signal to the electrical signals from the plurality of anodes and a timing parameter, such as the calculated electron cloud drift times, comparing each correlation value to a full charge collection (FCC) event correlation function, distinguishing between full charge collection (FCC) events and incomplete charge collection (ICC) events based on a result of the comparison of each correlation value to the full charge collection (FCC) event correlation function.

Performing the correlation value comparison algorithm may also include rejecting electrical charge signal events determined to correspond to ICC events and excluding those ICC events from radiation detector spectral analyses. The method further includes generating electrical signal energy spectra for the electrical signal parameters measured by the SRDC and saving the electrical signal energy spectra. The method may also further include evaluation by the processor of a radiation detector performance factor based on a ratio of an average of FCC event electrical signal energy spectra to an average of electrical signal energy spectra associated with both FCC and ICC events.

Cadmium Telluride (CdTe or CT) and Cadmium Zinc Telluride (CdZnTe or CZT) are very attractive materials for room temperature semiconductor radiation detectors due to their wide bandgap and atomic number. However, poor hole mobility has required development of special techniques to enhance suitability for detection of ionizing radiation. Two major techniques that have been explored include 3-D pixilated detectors and Frisch-ring detectors. Frisch-ring or Frisch-grid CZT detectors, having a simple configuration and excellent spectral performance, present a particularly attractive option. U.S. Pat. No. 6,175,120, "High-Resolution Ionization Detector and Array of Such Detectors," by D. S. McGregor, et al., describes CdZnTe radiation detectors, the small pixel effect, and the Frisch-grid effect, and is herein incorporated in entirety by reference.

A preferable solution to the problems posed by ICC events is to recognize and reject ICC events caused by crystal defects, while retaining full-charge collection (FCC) events in detector energy spectral responses. Such a rejection algorithm is possible in any single-polarity carrier device in which the amplitudes of signals read out from the cathode and anode(s) must be correlated with electron drift time(s). Any function representing such a correlation can be used to distinguish between FCC- and ICC-events.

ICC rejection primarily deals with ICC events resulting from charge carrier trapping by defects, Te inclusions, and subgrain boundaries and dislocations. Rejection of ICC events does not result in any further loss of detection photo-efficiency since ICC events do not contribute to the photopeak. However, rejecting ICC events can significantly improve the spectral response (energy resolution, peak-to-Compton ratio) and enhance overall detection sensitivity of devices fabricated from crystals with relaxed quality requirements. Such crystals are currently available from vendors.

In multi-anode detectors, e.g., pixilated ones, ICC events can be mimicked by charge-sharing between several anodes or multiple interactions due to Compton scattering. In such cases, the cathode still will collect the full charge, while the individual anodes will collect a fraction of the charge resembling the ICC event caused by the defects.

Rejecting the ICC events allows for use of imperfect crystals from less expensive material for radiation detector devices. For example, crystals having imperfections including dislocation-related defects, such as inclusions of impurities, walls of dislocation, cellular structures, low-angle boundaries, and sub-grain boundaries can be incorporated into effective radiation detector devices. After Te inclusions, subgrain boundaries and dislocation bands are the most critical defects that degrade detector responses.

I. Roles of Crystal Lattice Te Inclusions

Point defects (native and impurities) can trap up to 20% of the charge in long-drift time detectors. However, because their spatial distributions usually are described by slowly changing functions, charge losses can be corrected, and energy resolution can be recovered to its intrinsic value.

The effects of Te inclusions depend on their sizes and concentration. Small inclusions, <3 μm, behave similarly to point defects, but big inclusions, >10 μm, entail significant fluctuations in the collected charge. It is very likely that such inclusions set the low limit on the energy resolution in detectors fabricated from the second wafer.

As illustrated in FIG. 4A, the crystal from wafer #1 had notably smaller Te inclusions than did wafer #2. Therefore, it was expected that the performance of detectors fabricated from the second wafer would be degraded. FIG. 4B shows the scatter plot of energy resolution versus inclusion concentration (with diameters greater than 3 μm) measured for the detectors from wafer #1. FIG. 4C provides the same information for wafer #2.

As seen in FIG. 4B, no correlation was found between concentration of Te inclusions and energy resolution for detectors fabricated from wafer #1. In FIG. 4C, the data points located at the bottom of the distribution for wafer #2 follow a straight line in accordance with predictions given in the reference by Bolotnikov, et al., "Effects of Te inclusions on the performance of CdZnTe radiation detectors", *IEEE Trans. on Nucl. Science* 51, No. 5, 2757-2764 (2008), herein incorporated in entirety by reference.

Based on the relationship shown in FIG. 4C, it can be concluded that the peak broadening due to Te inclusions in the detectors fabricated from wafer #1 (with small inclusions) is less than 0.8%. For detectors fabricated from the wafer #2 (large inclusions), photopeak broadening increases with concentration of inclusions. Data points located above the line indicate the presence of other dominating defects.

II. Roles of Crystal Lattice Subgrain Boundaries and Walls of Dislocations

Dislocation-related defects are the most detrimental to device spectral response. These defects are linear dislocations and dislocations arranged in two- and three-dimensional structures. i.e., walls of dislocations, low-angle and subgrain boundaries, cellular- and mosaic-structures. Dislocations accumulate impurities and secondary phases (Te inclusions). Depending on the density and orientation of dislocations, they trap both the significant- and small-fractions of the electrons from the charge clouds. They also affect the trajectories of local electric fields and electron-cloud drifts. Interplay between these defects may result in broadening of photopeaks and increase in the continuum in the majority of our detectors.

The presence of dislocation-related defects, boundaries and cellular structures consisting of arranged dislocations of different densities, present in high-quality commercial material, has important because of the effects on electronic performance. The differences between subgrain boundaries, low- and high-angle boundaries, diffuse boundaries, and walls of dislocations primarily are related to their geometrical sizes and dislocation densities. FIGS. 4D and 4E show examples of subgrain boundaries revealed by White X-Ray diffraction topography (WXDT) (FIG. 4D), and the walls of dislocations exposed by surface etching (FIG. 4E).

Dislocations are known to accumulate high concentrations of electron traps and affect the local electric field and, consequently, the drift paths of electron clouds. In the large-aspect ratio devices, like virtual Frisch-grid detectors, the curved electron paths can reach the side surfaces of a crystal before the anode, resulting in signal losses.

Regardless of the nature of these defects, they can be associated with macroscopic regions filled with traps; however, unlike point defects, such regions are not distributed uniformly over devices' volumes. The continuous charge losses caused by point defects correlate with the electrons' drift times, so that we can correct for them. The inhomogeneous distribution of traps results in random charge losses that are uncorrectable. Depending of the amount of lost charge, it can affect the spectral responses in two ways.

If the amount of charge lost after an electron cloud encounters a defect is small, it is likely that these defects would cause broadening of the photopeak, since such small variations in the charge loss would accumulate with drift distances. These losses typically are associated with small Te inclusions, 3 μm, and low-density dislocation boundaries.

Conversely, if a significant amount of charge is trapped, this will cause the photopeak events move toward the Compton continuum, meaning that resolution will stay intact, while photopeak efficiency will decrease. Such charge losses are associated with high-density dislocation boundaries and big Te inclusions, for example, >50 μm.

Clearly, in thin crystals, <2 mm, in which the broadenings of electron clouds due to diffusion are small, efficiency will be affected most. In thick devices, small inclusions and dislocations likely will entail deterioration in energy resolution. In other words, low-density dislocation boundaries and Te inclusions are more critical in long, >10 mm, devices. The ICC rejection algorithm entails no extra loss of photopeak efficiency to that caused by the bad regions of the crystal.

III. Rejecting ICC Events Due to Semiconductor Crystal Defects

Determining whether a detected ionization event within the detector represents an FCC event or an ICC event requires monitoring the current signal and amount of charge induced upon the detector electrodes by the event in question and calculating whether this charge is sufficient to qualify as an FCC event. The general method for calculating charge induced on electrodes resulting from the motion of charge carriers in a detector volume utilizes the Shockley-Ramo Theorem. Understanding detector timing properties and knowing how changing the location of radiation interactions within a detector material affects the pulse shape requires analysis of the time evolution of the signals.

Appendix D of the reference "*Radiation Detection and Measurement,*" 3rd ed. New York: Wiley 2000, by G. Knoll, describes application of the Shockley-Ramo Theorem to the problem of predicting induced charge in detector electrodes in response to ionization events and creation of charge carries in the detector volume and is herein incorporated by reference in entirety.

For detector devices that have detector geometries that are more complex than an ideal planar detector without boundaries or edges, a more fundamental approach is needed to carry out the analysis. Certain detector device configurations have electrodes that are segmented into separate strips or pixels. Predicting induced charges and types of signals expected on specific electrode segments also requires taking a more basic approach.

This analysis is applicable to all types of detectors in which charge carriers formed by radiation are caused to move in an electric field within the detector volume, including conventional detectors in which the active material volume is gas, fluid, or semiconductor.

The Poisson equation is the first step in the general approach to calculate the electric potential and electric field in a detector with arbitrary shape and orientation of its electrodes. It can be expressed as:

$$\nabla^2 \phi = \rho/\in \quad (1)$$

where $\phi$ represents electric potential, $\rho$ represents charge density—which can vary with position, and $\in$ represents the dielectric constant of the detector medium. For common detectors, the lack of trapped charges means $\rho=0$ and the Poisson equation is reduced to the Laplace equation:

$$\nabla^2 \phi = 0 \quad (2)$$

The Laplacian operator $\nabla^2$ is coordinate system specific, and the Laplacian corresponding to an orthogonal coordinate system is represented as:

$$\nabla^2 = \frac{\partial^2}{\partial x^2} + \frac{\partial^2}{\partial y^2} + \frac{\partial^2}{\partial z^2} \quad (3)$$

Solution required boundary conditions depend on the operating conditions of the detector. For application of an external voltage V between the two electrodes, a resulting boundary condition includes a change in the value of the potential p between the electrodes by V.

For simplistic models, analytical solutions can be used. For more complex detector geometries or shapes, numerical methods, such as computer codes or software, are required to obtain solutions. The solution represents the electric potential $\phi$ throughout the detector volume. Several commercially available software packages can solve the Poisson or Laplace equations for complex detector geometries and electrode configurations.

The gradient of the electric potential:

$$E = -\text{grad}(\phi) \quad (4)$$

will give the electric field E at any point within the detector. Ignoring diffusion, charge carriers generated within the detector due to ionization events follow the electric field lines, i.e. the maximum potential gradient, from their point of origin to the collecting electrode. The position of charge carriers as a function of time can be uniquely calculated by making an assumption about their velocity as a function of electric field, e.g. a proportional relationship indicating a constant mobility.

In some detector devices, an ideal single-carrier detector is made from a perfect crystal. This detector will operate as a single-type carrier device, meaning that the anodes only collect electrons, while the holes remain stationary at locations where an interaction takes place. CZT detectors operate as single-type carrier (electrons), meaning that device geometrical parameters and contact configurations should be chosen to minimize the contribution of uncollected holes, whose effect on output signals depends on the location of interaction points.

In a single-type carrier device, the response of the anode is nearly independent of the location of the interaction points, except for the narrow region between the anode and virtual grid. In contrast, the cathode signal gradually varies between its minimum and maximum. These two dependences make it possible to correlate the measured amplitudes of the cathode and anode (anodes) signals, and the electron cloud (clouds) drift time (times).

The actual dependences of the cathode and anodes signals versus drift distances may slightly deviate from linearity, depending upon the device's geometry. Furthermore, in the ideal detector, every set of signals generated by an interaction event should obey these functions. Therefore, these dependences can be used to construct a single correlation function connecting all the measured signals. In other words, the distribution of dots (coordinate vectors) representing the interaction events in some coordinate space should precisely follow the curvature of the correlation function.

In actual physical detectors, the dots can shift from the ideal curve. The dots representing the FCC events will be concentrated around the curve within a narrow band determined by electronic noise, while those representing ICC events will fall outside this band. If the curve of the correlation function is known, it can be used to distinguish between the normal FCC and ICC events caused by both defects in the crystal, and by charge sharing in devices with multiple anodes. By choosing a certain width about the curve, the fraction of the rejected versus accepted events can be controlled.

The simplest example of the correlation function, R, is a charge-normalized dependence of the cathode signal versus the drift distances. In practice, this function is approximated as the ratio of the cathode and anode signals, $A_{cathode}/A_{Anode}$, plotted versus the drift times, $T_{Drift}$, measured for each interaction event:

$$R(T_{Drift}) = \frac{A_{Cathode}}{A_{Anode}} \quad (5)$$

Sometimes, it is more convenient to use the product of the cathode-to-anode ratio and the drift time:

$$R(T_{Drift}) = \frac{A_{Cathode}}{A_{Anode}} T_{Drift} \quad (6)$$

R must be measured for each detector pixel before using the rejection algorithm. Several examples that follow (e.g. in the section on bulk 3D pixilated detectors) illustrate how to evaluate the correlation function, R, and implement the events-rejection algorithm.

In the above example, the correlation function proposed primarily is used for rejecting the ICC events in the parallelepiped-shaped virtual Frisch-grid detectors. However, it can be employed for any single polarity carrier transport detectors in which the amplitudes of the cathode and anode(s) signals and electron cloud drift times are measured independently. For example, with some modifications, this technique is suitable for coplanar-grid-detectors (USSR patent SU-1264723A to Miroshnichenko, et al., issued Jun. 15, 1986; Luke, *Appl. Phys. Lett.* 65 (22), pp. 2884-2886, 1994; and U.S. Pat. No. 5,530,249 (1996); each incorporated herein by reference in their entirety), semispherical-detectors (Parnham, et al., *Hard x-ray, Gamma-Ray and Neutron Detector Physics, Proceedings of SPIE*, 1999; Szeles, et al., *Hard X-Ray and Gamma-Ray Detector Physics VIII, Proceedings of SPIE* Vol. 63 19, 2006; each incorporated herein by reference in their entirety), and pixel-detectors (Barrett, et al., *Phys. Rev. Lett.* 75 (I), p. 156, 1995; which is incorporated herein by reference in its entirety).

The multiple interaction-point events that have high probabilities in large-volume detectors can affect a quality of the rejection algorithm by broadening the correlation curve between measured signals and drift times. In such cases, a trade-off must be considered between the loss of efficiency and actual spectral improvements. Below (in the sections on bulk 3D pixilated detectors and virtual Frisch-grid detectors), results from evaluating this simple algorithm for virtual Frisch-grid- and pixel detectors are demonstrated. In general, the charge signals read out from the anodes and the cathode depend on the device geometry and the configuration of electrode(s).

However, the responses of almost all commonly used devices, such as pixel-, coplanar grid- (CPG), and virtual Frisch-grid- (VFG) ones, can be described in a similar way. Calculations of the charge signals generated inside a detector are based on the weighting potential functions unique to that particular device, and yet, in the first order of the approximation, they are very similar.

The weighting potential, by definition, determines the amount of the charge induced on a particular electrode by a point-like charge located some distance from the electrode. In general, it is possible to approximate the weighting potentials with the two linear functions illustrated in FIG. 6A. This approximation is valid for the pixel-, CPG-, VFG- and other spectroscopic detectors.

Figure 6A:
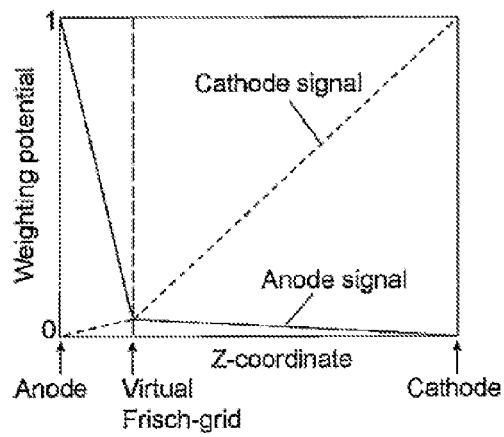
FIG. 6A is a plot that shows dependencies of the weighting potentials versus drift distance in a typical single-polarity carrier detector.

As FIG. 6A shows, the weighting potential of the anode approached zero between the cathode and the so-called virtual Frisch-grid, an imaginary shielding electrode that divides the detector's active volume in two distinct regions and plays that same role as a real shielding electrode does inside a classic gas-ionization chamber; the potential rises rapidly in the grid-to-anode region.

Figure 6B:
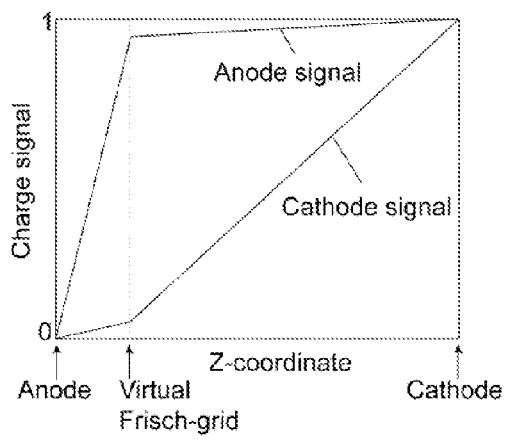
FIG. 6B is a plot that shows dependencies of the output signals versus drift distance in a typical single-polarity carrier detector.

In contrast, the cathode weighting potential decays linearly inside the cathode-to-grid region and remains close to zero between the grid and the anode. The slopes of both dependences in the cathode-to-grid region reflect the inefficiency of shielding by the virtual grid. We can use the same two-slope approximations to describe the dependencies of the output signals (i.e. the integrated currents) generated on the anode and cathode, as illustrated in FIG. 6B.

Figure 6C:
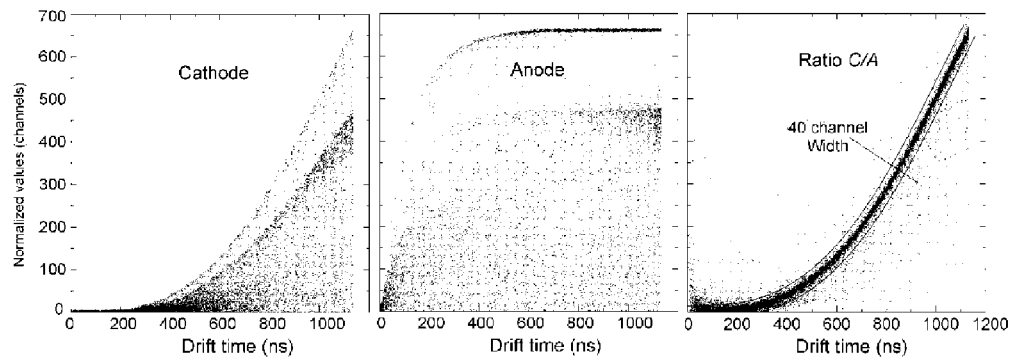
FIG. 6C are distribution plots of the normalized (a) cathode signals, (b) anode signals, and (c) the cathode-to-anode ratio C/A versus the drift time, T, simulated for a defect-free ideal 6×6×15 mm³ virtual Frisch-grid detector. The detector was flood-illuminated from the cathode side by 662-keV gamma rays.

FIG. 6C shows Monte-Carlo simulated distributions of the cathode (a), anode (b) and the ratio C/A versus drift time (c) for a 6×6×15 mm3 virtual Frisch-grid detector. All the distributions in FIG. 6 were normalized to a maximum channel of 662. In the simulation, an exact weighting potential was used to calculate dependencies of the signals from the cathode and anode versus the drift time in a defect-free ideal detector. The device was flood-illuminated from the cathode side with 662-keV gamma rays. The combined electronic- and statistical-noise was assumed to be 0.5% at 662 keV. For multiple interaction-points events, the drift time was measured at the arrival time of the last electron cloud. The low-energy threshold was set to 25 keV. These simulations predict that ~25% of the events fall outside the 20-channel wide corridor around a curve representing the correlation function evaluated for the single interaction point events. Increasing the acceptance corridor to 40 channels (shown in FIG. 6 (right plot)) reduces the number of wrongly rejected events to 15%. In pixel detectors with typical pixel sizes of less than 2 mm, the fraction of incorrectly rejected events is expected to be significantly smaller. In comparison, in a large area device, e.g., a 20×20× 15 mm$^3$ coplanar grid detector, ~40% of the total number of the events (photopeak and Compton continuum) and ~60% of the photopeak events will be misidentified and rejected.

The calculation of the charge induced on detector electrodes due to moving charge carriers employs the Shockley-Ramo Theorem and the concepts of a weighting field and a weighting potential, the disclosure of which can be found in "Currents to Conductors Induced by a Moving Point Charge," *J. Appl. Phys.* 9, 635 (1938), by W. Shockley and "Currents Induced by Electron Motion," *Proceedings of the I.R.E.* 27, 584 (1939), by Simon Ramo, provide the basis for the Shockley Ramo Theorem, and are herein incorporated in entirety by reference.

The theorem represents instantaneous current induced on a particular electrode as:

$$i = \vec{q}\vec{E}_0 \quad (7)$$

where q is carrier charge, $\vec{v}$ is carrier velocity, and $\vec{E}_0$ represents the weighting field.

Framed a different way, induced charge on the given electrode can be represented by the product of carrier charge multiplied by the difference in the weighting potential $\phi_0$ from start to end of the carrier path:

$$Q = q\Delta\phi_0 \qquad (8)$$

Determining weighting potential $\phi_0$ as a function of position requires solving the Laplace equation for the particular geometry of the detector.

However, certain artificial boundary conditions are needed: 1) voltage on the electrode chosen for calculation of induced charge is set at unity; 2) voltages on all other electrodes are set at zero; and 3) any trapped charges inside the detector volume are ignored (i.e., use of the Laplace equation, Eq. (2), rather than the Poisson equation, Eq. (1)).

In certain alternative detector devices, where a single continuous electrode (plain bulk 3D detector) is used rather than a pixilated electrode, the potential on the electrode at the z=T surface is set to unity and the potential on the electrode at the z=0 surface is set to zero.

Given the artificial boundary conditions, solving the calculations yields the weighting potential, the gradient of which represents the weighting field. The weighting potential does not comprise actual electric potential present within the detector, it is rather the embodiment of a convenience that permits simplified modeling of the charge induced on the given electrode by determining the difference in weighting potential at the start and end of the carrier path of motion.

The actual electric field lines determine the path of the charge carrier. Determining the position of the charge carrier through time develops the temporal profile of induced charge/current, which can be used to determine the shape of the output pulse.

Every device (or pixel) has its unique correlation function. Sometimes it is more convenient to use the product of the cathode-to-anode ratio and the drift time, (C/A)T. In this case, the correlation function becomes close to linear function which is easier to use in practical calculations.

IV. Bulk 3D Pixilated Detectors

Figure 5:
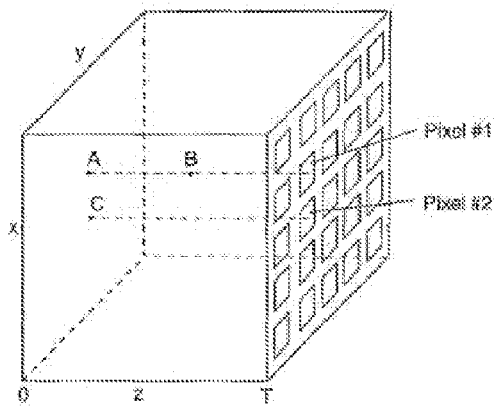
FIG. 5 is a schematic illustration of a planar detector configuration of the prior art with a continuous cathode electrode on the x-y surface at the left and a pixelated anode surface on the right.

Bulk 3D pixilated detectors comprise detector devices where the radiation detector volume is continuous and the detector includes one shared electrode and an opposing plurality of pixel electrodes, as in FIG. 5, with readout electronics. In FIG. 5, a bulk planar detector is configured such that a conventional continuous electrode covers the entire surface z=0, on the left. The opposite surface, z=T, has a pixilated electrode pattern with square electrode comprising each pixel and gaps between adjacent pixels. Each pixel electrode has its own individual electrical contact.

Alternate detector device electrodes include point contact electrodes and electrodes with the same or different physical specifications and measurements as the electrode on the z=0 plane. Again, according to boundary conditions ignore trapped charges in the detector volume. Also, for planar detectors assume the dimensions of the detector in the x-y plane are large compared to thickness T, making edge effects inconsequential in the calculations.

By applying a uniform voltage on all pixel electrodes, it becomes possible to ignore the negligible effects of the small gaps in the actual electric potential and electric field distributions generated within the detector volume. The resolved Laplace equation can then be considered equivalent to the case where a single continuous electrode replaces the pixilated electrodes, at z=T. Between the electrodes the electric potential changes linearly, and the electric field is essentially uniform within the detector volume.

Operating the pixels at a positive potential (as an anode) relative to the other electrode will attract negative charge carriers (electrons) along parallel field lines perpendicular to the detector electrode surfaces. Ignoring diffusion, the charge carriers will intersect the pixilated electrode directly to the right of the interaction site where the charge carriers are formed within the volume. Positive charges, such as holes or positive ions, move toward the continuous cathode at the left surface of the detector.

Calculating an expected electrical signal output from a single pixel electrode requires application of the Shockley-Ramo theorem to first determine the configuration of the weighting potential. Returning to the same Laplace equation, it is solved with boundary conditions setting the electric potential for the pixel of interest to unity, and the potential of all other pixels and the electrode on the opposite surface to zero.

Figure 7A:
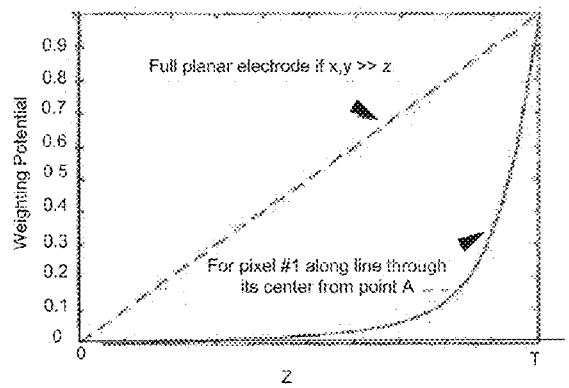
FIG. 7A is a plot of the weighting potential for a continuous anode (dashed line) and for a single pixel anode (solid line) as illustrated in FIG. 1, for the case in which the pixel size is 20% of the detector thickness T.
Figure 7B:
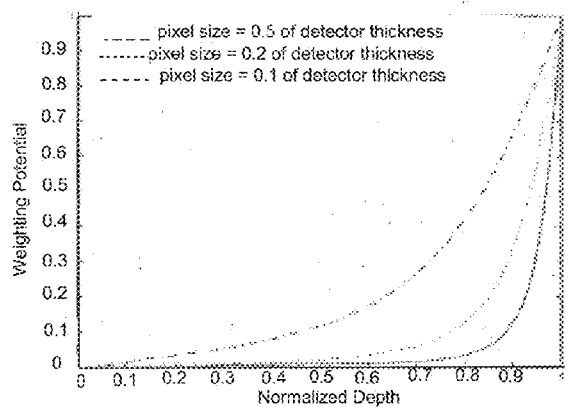
FIG. 7B is a plot of the weighting potential for three different pixel electrode sizes. The small pixel effect is enhanced as the pixel size is made small with respect to the detector thickness (top and bottom curves).
Figure 7C:
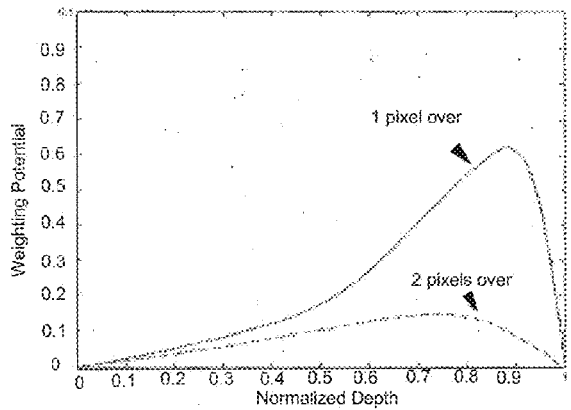
FIG. 7C is a plot showing the weighting potential for Pixel #1 of FIG. 1 (solid line) along an axis that is perpendicular to the center of an adjacent pixel. The dashed line shows the same variation along the axis of a pixel that is located two pixels away. The pixel size is 20% of the detector thickness T as in FIG. 7A.

Results for weighting potential of the pixilated electrode are plotted in FIG. 7A, and at different detector thicknesses in FIGS. 7B and 7C. The shape of the nonlinear weighting potential depicts a gradient that is more pronounced at distances closer to the pixel electrode of interest.

Moving charge carriers closest to the pixel surface contribute most strongly to induced charge. The effect is similar to that of a Frisch grid in an ion chamber, where only to the portion of the electron motion that takes place between the grid and anode affects the output signal, which is free from any positive charge carrier motion contributions.

Positive charges in motion will contribute most of the charge induced on the pixel electrode only for charges created very near the pixel electrode surface, a relatively small portion of the detector volume. Electrons in motion will contribute much more than moving positive charges for a vast majority of radiation interaction events in the detector volume because induced charge is proportional to the difference between weighting potentials at the points of origin and electrode intersection.

These characteristics are most prominent in detectors having pixel dimensions that are small compared to detector thickness (see FIG. 7) and are referred to as the small pixel effect. For detectors such as compound semiconductors, in which electrons have much greater mobility than positive charge carriers, reading signals from smaller pixels rather than from larger-area anodes minimizes pulse amplitude sensitivity to moving positive charges that may not have been collected completely and improves energy resolution.

Application of the Shockley-Ramo Theorem to calculating the amplitude of a charge induced on a pixel electrode for a semiconductor detector (FIG. 10) first requires consideration of the scenario where $n_0$ electron-hole pairs are created from an ionizing event at a point (designated as "A" in FIG. 5). "A" is quite close to the cathode surface and occurs on an ideal electric potential gradient line perpendicular to the center of the surface of pixel #1.

Holes will travel only an insignificant distance to the cathode and consequently will not contribute significantly to the signals considered in this embodiment. Therefore, current (and charge) induced on the pixel electrode is due entirely to electron motion. Induced current on the pixel electrode is small at first as the electrons start moving towards the right through a region wherein weighting potential changes slowly, i.e. the weighting field is small.

With increased proximity to the pixel electrode the weighting field increases faster, and induced current climbs until the electrons are collected. The electrons begin moving from a point where the weighting potential for the pixel is essentially equal to zero to a point where it is equivalent to unity, i.e. at the surface of the pixel #1 electrode.

From Eq. (8), total induced charge is represented by the product of the total moving charge, $-n_0e$, multiplied by the difference in the weighting potential between the end and the start of the electron path of motion (unity), i.e. total induced charge equals $-n_0e$. This result is consistent with calculations according to the conservation of energy for the simple case of a pulse from an ion chamber, which is also applicable to planar semiconductor detectors.

For more general detector devices, in which the motions of both electrons and holes contribute to the signal, assume the radiation interaction point of the ionizing event occurs at an arbitrary depth along the electric potential gradient line perpendicular to the center of pixel #1, at point "B" in FIG. 5, where the value of the weighting potential has the value "β" (0<β<1). The charge induced on pixel electrode will therefore have two components: one from the motion of electrons, and the other from the motion of holes.

Assuming all charge carriers are completely collected without loss to either recombination or trapping, the total induced charge can be calculated by applying Eq. (8) to both the electrons and holes. The moving electrons comprise a charge of $-n_0e$ in motion over a difference in weighting potential of (1-β), making the contribution to the induced charge due to electrons equal to $-n_0e$ (1-β).

The moving holes comprise an equal and opposite charge of $n_0e$ in motion over a difference in the weighting potential of -β, making the contribution to the induced charge due to the holes equal to $-n_0e\beta$. Combining these two contributions gives a total induced charge of $-n_0e$, the same result as in the first case. Therefore, the amplitude of the induced charge is not influenced by the position in the detector volume at which the charges are formed, given complete collection of all carriers.

In detectors having pixilated or segmented electrodes, such as in the configuration of FIG. 5, induction of transient current signals can occur at more than one electrode pixel even when charge carriers are formed within the detector volume at a single point.

Considering formation of no electrons close to the cathode at a position (shown as point "C" on FIG. 5), these electrons follow the electric potential gradient along the electric field lines that are perpendicular to and collected at the surface of Pixel #2 electrode, a pixel adjacent to pixel #1. The weighting potential for Pixel #1 is basically zero at the beginning of this electron path and zero at the termination of the path, so when the electrons are collected by the neighboring pixel #2, no net charge is induced.

However, as shown in FIG. 7C, along their path of motion the electrons pass through a region in which the weighting potential for Pixel #1 climbs to a maximum value before declining to zero. Therefore, even though no electrons are collected at Pixel #1 in this case, a transient signal is induced on the Pixel #1 electrode. The induced current in Pixel #1 will have a bipolar shape, where the positive and negative parts cancel out to yield a net zero integrated charge.

The generated pulse amplitude would also be very close to zero, when using a pulse shaper having a long integration time. However, a finite amplitude pulse is generated that preferentially reflects the part of the charge induced having the fastest time characteristics, when employing shorter shaping times. The pulses induced on adjacent pixels that do not actually collect charge carriers are sometimes referred to as "spectator pixel" signals.

For all events that occur at locations within the projected area of the primary pixel, the pixel electrode collecting the charge carriers, the charge induced on the primary pixel is the same. Therefore, using the largest pixel signal, simple positioning schemes can sense and locate ionization event to within the projection area of the primary pixel.

Because induced signals on adjacent pixels are sensitive to small changes in the location of any individual ionization event, utilizing these signals makes possible more exact position sensing schemes for precisely locating events within a detector volume. Reading out all pixel signals from the neighborhood of the primary pixel allows application of an interpolation scheme to locate an ionization event to within fractions of a pixel dimension. Therefore, the precision and accuracy of the ionization event location algorithm depends on pixel size.

In 3D devices, readout electronics register amplitudes and drift times for the cathode and pixilated anode for each interaction. Because a 3D device gives amplitudes and timing information for each interaction point from the event, there are several correlation functions that can be used for selecting the ICC events. For example, the ratio for the $i^{th}$ pixel of $$R(T_{Drift}^i) = \frac{A_{Cathode} T_{Drift}^i}{\sum_j A_{Anode}^j T_{Drift}^j} \tag{9}$$

or, $$R(T_{Drift}^i) = \frac{A_{Cathode} (T_{Drift}^i)^2}{\sum_j A_{Anode}^j T_{Drift}^j} \tag{10}$$

can serve as the correlation function for each of the pixels. Eqs (9) and (10) are, respectively, generalizations of Eqs. (5) and (6).

For testing, a 20×20×15 mm³ CZT detector was flood-illuminated with an uncollimated $^{137}$Cs source and data streams were generated by 3D readout electronics after collection at two pixels. Analysis of the data employed the same correlation function used for the virtual Frisch-grid detectors, as found in FIG. 10D and as described below.

First, consider the case where Pixel #1 has a good response. Selected events contain the signals from Pixel #1, regardless of which pixel was triggered. Plotted distribution of $(A_{cathode}/A_{Anode})(T_{Drift})$ Vs. $T_{Drift}$; the corresponding pulse-height spectra shown in FIGS. 8A and 8C, respectively, are based on these data.

To evaluate the correlation function, R, events under the photopeak (i.e., full-energy deposition events) were selected and plotted, as shown in FIG. 8B, along with a solid line representing the fitted results. The correlation function defines the low edge of the distribution of total events illustrated in FIG. 8A. By selecting a narrow band (i.e., 25 channels) around the correlation curve, ICC events can be identified and rejected from the pulse-height spectrum. FIG. 8E depicts the "cleaned" spectrum.

By comparing these spectra, a significant reduction of the events contributing to the continuum is seen, while the photopeak remains unchanged. The cut of the spectrum around a channel of 300 corresponds to the trigger threshold used to collect the data. This cut is not apparent in the total events spectrum due to the charge-sharing effect when adjacent pixels were triggered.

Since all possible kinds of ICC events were rejected, including charge sharing and Compton scattering that resemble the ICC events, the only ones left in the spectrum in FIG. 8E are those that actually activated Pixel 1. For comparison, the pulse-height spectrum of the events that triggered Pixel 1 without charge sharing (true single-pixel events) are shown in FIG. 8D.

This spectrum also shows a threshold cut; however, compared with the spectrum in FIG. 8E, it has a slightly higher level of continuum events in the low-channel regions. This is attributed to some fraction of the "undetected" multiple interaction points (Compton) events, since not all of the device's pixels were operating. This particular pixel was not expected to detect many of the ICC events caused by crystal defects. FWHM of the photopeaks in these spectra were less that 0.9%.

For such multiple events, the amplitude and timing information can be used for each interaction point. A fraction of the total cathode signal, $C_i$, generated by the charge deposited within the $i^{th}$ pixel can be estimated with good accuracy by $$C_i = C \frac{A_i T_i}{\sum_j A_j T_j}, \quad (11)$$

where $R_j$ are the correlation functions evaluated for each of the detector and $A_j$ are the measured anode signals. From here, one can find the estimates for the ratios $C_i/A_i$:

$$C_i/A_i = \frac{CR_i(T_i)}{\sum A_j R_j(T_j)} \quad (12)$$

Figure 20:
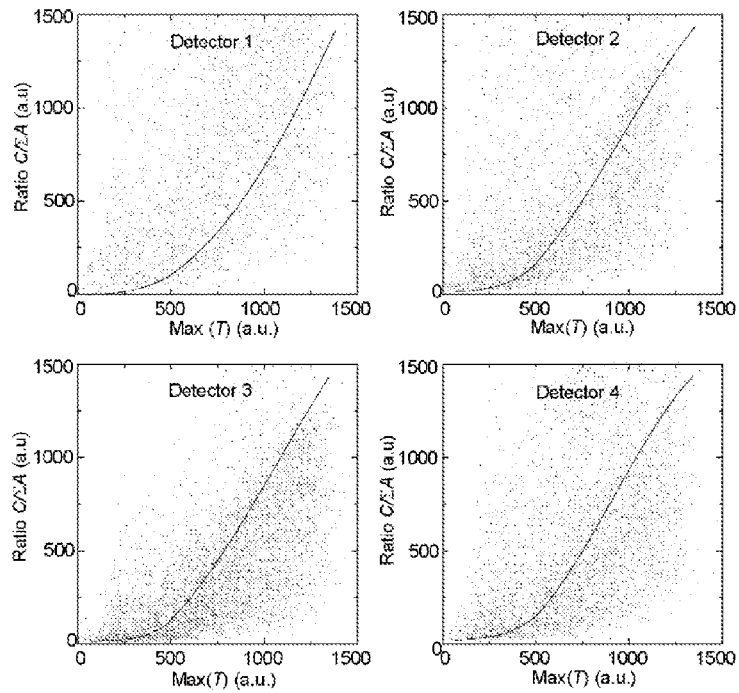
FIG. 20 are plots that illustrate a ratio of the cathode signal, C, and the sum of the two anode signals, ΣA versus the drift time corresponding to the maximum deposited charge, max (T). The solid lines represent the correlation functions evaluated for these detectors.
Figure 21:
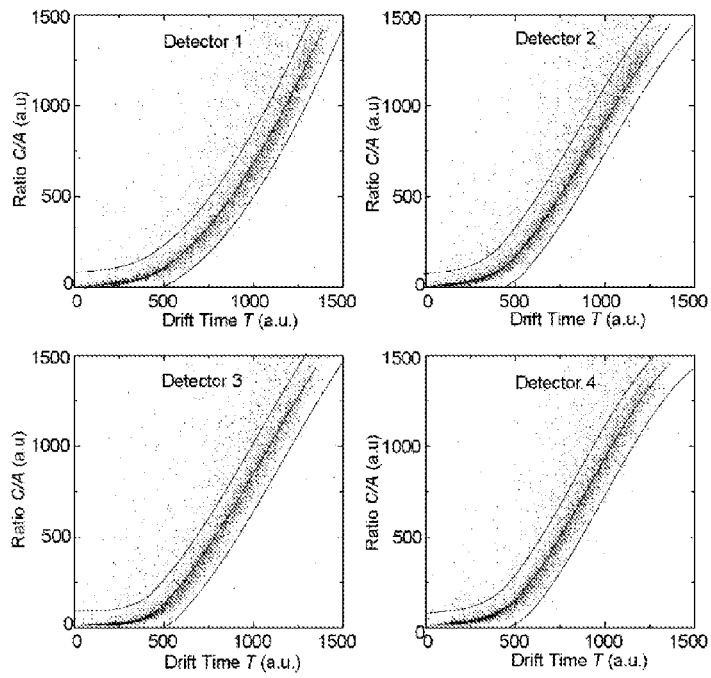
FIG. 21 are plots illustrating distributions C/A vs. T evaluated for two-detector events using Eq. 12. In contrast to the distributions in FIG. 20, the correlations are clearly seen in these plots.

The sum is taken over all the interaction points. In this formula, it is assumed that, at least in the first approximation, the signal generated on the cathode by the point-like charge is proportional to the distance to the anode, i.e., the drift time. In a general case, the actual dependencies of the cathode signals should be measured for each pixel. When $C_i$ is known, the cathode-to-anode ratios (11), known from calibrations, can be used to reject the ICC events. For example, this equation was used to reevaluate the data collected for the two-detector events shown in FIG. 20 collected on four detectors illustrated in FIG. 2C with interconnected cathodes. FIG. 21 presents the re-plotted distributions C/A vs. T, which resemble those plotted in FIGS. 10(c)-13(c) for the single-detector events (see FIG. 21).

Figure 9:
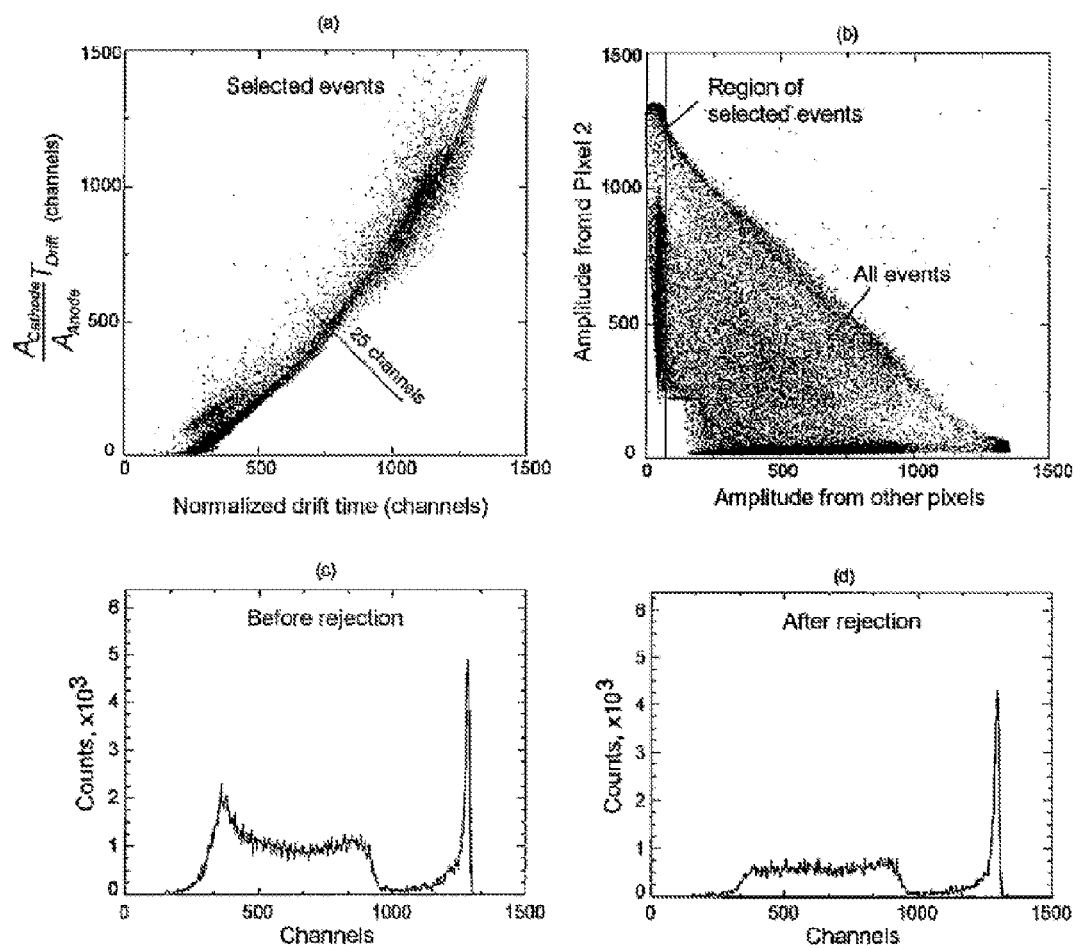
FIG. 9 are plots that illustrate (a) the distribution of $(A_{cathode}/A_{Anode})(T_{Drift})$ vs. $T_{Drift}$ and (c) the corresponding pulse-height spectrum plotted for the true single-pixel events; (b) correlation between the signals readout from the selected pixel and the maximum of signals measured from all other pixels; (d) pulse-height spectrum after rejection. The energy resolution measured for this pixel was ~1.5% FWHM at 662 keV.

Next, consider the case where Pixel #2 has a poor response. For application of the ICC rejection algorithm to a pixel with poor response, FIGS. 9A and 9C show the distribution of $(A_{cathode}/A_{Anode})(T_{Drift})$ Vs. $T_{Drift}$ and the corresponding pulse-height spectrum, as in FIG. 8, but plotted for events that triggered Pixel 2 without charge sharing (true single-pixel events).

These events were selected by plotting the correlation between signals readout from Pixel 2, and the maximum of signals measured from all other pixels, and then choosing those events within a narrow interval around the zero amplitude readouts from other pixels, as illustrated in FIG. 9B. Thereafter, ICC events were rejected as described in the Pixel #1 example.

The "cleaned" spectrum in FIG. 9D exhibits a significant reduction in the continuum, and slight improvement of energy resolution implying that many ICC events were rejected. However, these changes came at the expense of a loss in photopeak efficiency.

Virtual Frisch-Grid Detectors—Pixilated Detector Arrays

Pixilated detector arrays comprise detector devices where the radiation detector volumes are segmented and configured in an array. Individual radiation detector elements 12 have a shared cathode 30, which may be shared with other radiation detector elements 12. Individual radiation detector elements 12 may also have one or more pixel anodes 20, isolated to that particular detector segment 14. Virtual Frisch-grid, or virtual Frisch-ring detectors incorporate a shielding electrode to surround a portion of a detector segment to help reduce noise and improve energy resolution. The references by Bolotnikov, et al., "Optimization of virtual Frisch-grid CdZnTe detector designs for imaging and spectroscopy of gamma rays," *Hard X-Ray and Gamma-Ray Detector Physics VIII*, Vol. 6702, Proceedings of SPIE, 2007, "Performance Characteristics of Frisch-Ring CdZnTe Detectors," *IEEE Transactions on Nuclear Science*, Vol. 53 (2), pp. 607-614, 2006, and "Array of Virtual Frisch-Grid CZT Detectors with Common Cathode Readout and Pulse Height Correction," *Proceedings of SPIE*, 7805, 780504 (2010) and the references by Cui, et al., "CZT Virtual Frisch-grid Detector: Principles and Applications," *Fifth Annual IEEE Long Island Systems, Applications and Technology Conference*, (2009) and G. Montemont, et al., "A Capacitive Frisch Grid Structure for CdZnTe Detectors," *IEEE Trans. Nucl. Sci.*, Vol. 48, pp. 278-281, 2001, describe virtual Frisch-grid detectors and are herein incorporated in entirety by reference.

In some detector devices, the radiation detector device is assembled with a common cathode-readout as a virtual Frisch-grid (VFG) detector array for correcting pulse-height and rejecting ICC events. This type of detector provides excellent energy resolution and large effective areas. It offers a robust, low-cost approach to making the large-area detecting planes that potentially can substitute for more efficient but more expensive 3D devices in applications with slightly relaxed requirements for position- and energy-resolution. 3D devices are not very suitable for making large-area detector planes for imaging instruments because of the high cost and low availability of large-volume, 20×20×15 mm$^3$, CZT crystals.

Virtual Frisch-grid detector design relies on using large geometrical-aspect ratio, parallelepiped-shaped (bar) crystals with the cathode and anode electrodes, respectively, deposited on the top- and bottom-surfaces and an additional shielding electrode placed on a crystal's side to create the virtual Frisch-grid effect. Fabrication of VFG detectors entails wrapping or coating the sides of a crystal with a thin layer of an insulating film, followed by a layer of aluminum- or copper-foil. The foil could also be fabricated from any metallic conducting material.

A virtual Frisch-grid CZT detector design for parallelepiped-shaped CZT bar crystals includes a Frisch-ring (or capacitive Frisch-grid), wherein the shielding electrode (Frisch-ring) is separated from the body of the detector by a layer of insulator, is grounded in the final assembly, and may extend over only a portion of the detector segment sides or may extend over the whole detector side, from the cathode or from the anode, respectively, over only a portion of the detector or to the opposingly biased electrode. The Frisch-ring may include a layer of insulator overlapping a portion of the shared cathode, if the shared cathode extends down along the sides of detector segments.

When the cathode is biased negatively, this configuration (cathode, anode, and shielding) forms a focusing electrical field in the crystal's bulk. This focusing electrical field defines an active region in which the device's response changes only a little (i.e., <5%) from its maximum. The boundary of this region is defined as the virtual Frisch-grid. Our calculations show that this location depends strongly on devices' width, not its length. This distance of this location to the anode roughly is equal to the width of the device. Thus, the volume of the active regions increases proportionally to the device's thickness, so that longer crystals will exhibit better spectral responses.

Since the cathode is isolated from the shielding on the side surfaces, the signal readout from cathode also can serve as a depth-sensing technique to correct the charge-loss caused by electron trapping, and further improve the spectral response.

Using long CZT crystals with a high geometrical aspect ratio is a key requirement for achieving high-energy resolution and a high peak-to-Compton ratio. However, in thick devices, electron trapping by defects is severe and must be corrected to retain high spectral-resolution. Implementing a cathode-readout scheme assures this by allowing first to correct for electron trapping and second to reject events interacting near the anode and contributing to the background.

For evaluation of 5 (five) exemplary prototype embodiments of 6×6×15 mm$^3$ CdZnTe VFG radiation detector devices, each with about a 5.0 mm long shielding electrode placed at the anode to produce the VFG effect, the radiation detection events were generated by an uncollimated $^{137}$Cs source located about 1.0 cm above the cathode.

Figure 10:
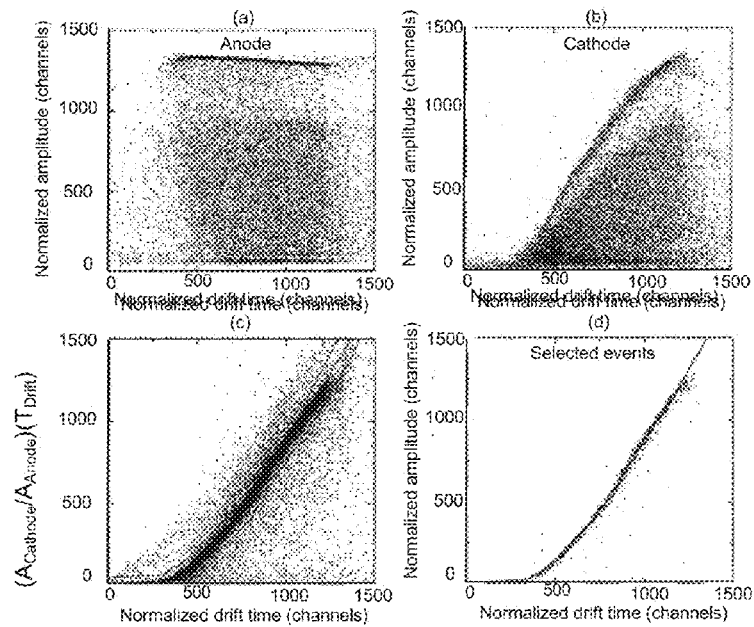
FIGS. 10-13 are distribution plots of the output signals measured from the anode (a), cathode (b), and of the product of $(A_{cathode}/A_{Anode})(T_{Drift})$ (c) versus the normalized drift time. The correlation function (d) was obtained by selecting the photoabsorption events that fall under the 662-keV photopeak in the pulse-height spectrum.

Both the cathode and the anode signals were read out via the charge-shaping preamplifiers, and digitized with a LeCroy Waverunner Oscilloscope. Normalized amplitudes of the cathode and anode signals and the electron drift times are evaluated for each event, and used to plot the different distributions described below. FIG. 10 shows the distributions of the signals read out from the anode $A_{Anode}$, cathode $A_{Cathode}$, and the product of $(A_{cathode}/A_{Anode})(T_{Drift})$ versus the drift time, $T_{Drift}$.

Dependences of the anode and cathode versus the drift time were plotted to illustrate that the virtual Frisch grid detector operates as a typical single-type carrier device. The dots representing 662-keV photoabsorption events concentrated around the curves are similar to those shown in FIG. 14. The broad continuum of dots (events) caused by Compton scattering and ICC events are also depicted in FIGS. 10(a)-(c).

These distributions collapse to a narrow band in the plot of the product of $(A_{cathode}/A_{Anode})(T_{Drift})$ versus $T_{Drift}$. As seen in FIG. 10(c), the majority of dots fall within a narrow band. The solid lines describe a 100-channel-wide band defined by the correlation function, $R(T_{Drift})$. The correlation function, $R(T_{Drift})$ was synthesized by selecting only the full-energy absorption events falling under the 662-keV photopeak in the pulse-height spectrum (FIG. 10(d)). The dots outside the band were identified as ICC events, which mainly originated from charge trapping at the detector side surfaces. ICC events were then rejected from the final pulseheight spectra.

Figure 14A:
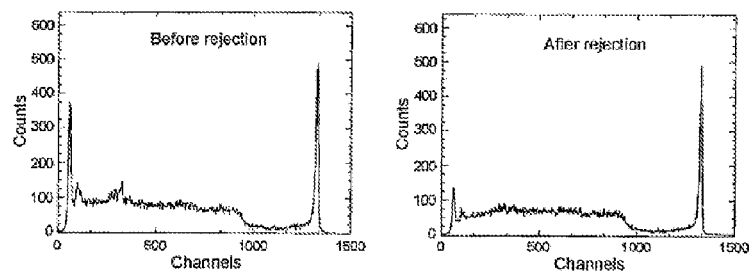
FIGS. 14A-14E are pulse-height spectra before (left) and after (right) applying the events rejection for the events plotted in FIG. 10-13, respectively.

FIG. 14A depicts the pulse-height spectra before and after the ICC events rejection; rejecting the ICC events outside the band results in a small but significant reduction of the continuum, while the photopeak remains unchanged. In this example, a detector with a small fraction of ICC events was used. Some of the reduction in the fluorescence peak in the low-energy region is caused by electronic noise that affected the drift-time measurements for events interacting near the cathode (low-energy events). This problem can be resolved by using low-noise electronics.

Figure 12:
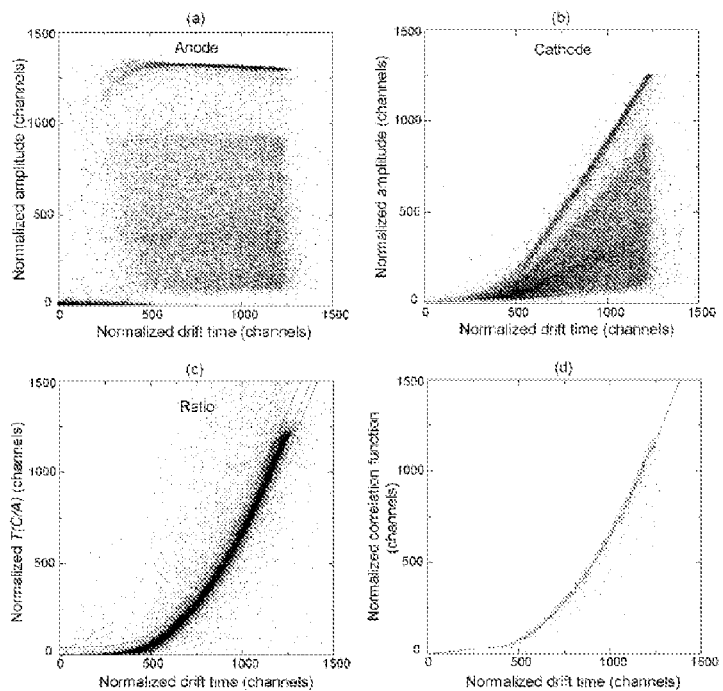
Figure 14B:
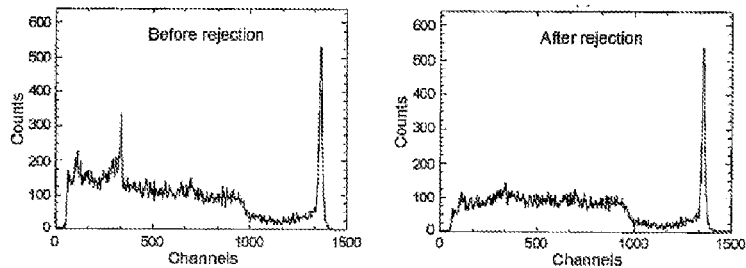
Figure 14C:
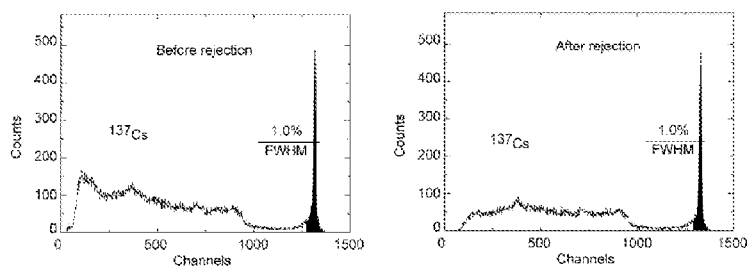

FIGS. 12 and 14C illustrate plots and pulse-height spectra for another example of a virtual Frisch-grid detector with a relatively low content of extended defects. FIG. 14C depicts the pulse-height spectra before and after rejecting the events outside the acceptance band. This results in a notable reduction of the continuum, while the photopeak remains practically unchanged (4% reduction). The initial spectrum was corrected for charge trapping before rejecting ICC events.

Figure 14D:
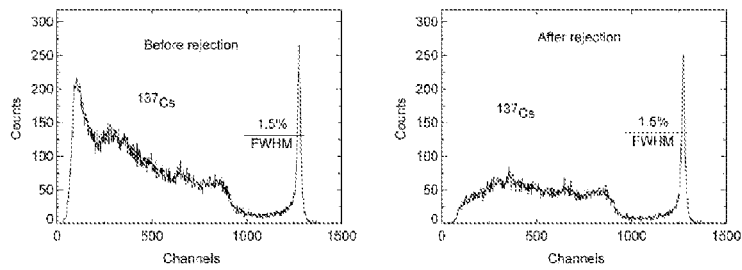

FIG. 14D shows the pulse-height spectra before and after the events rejection, evaluated for a virtual Frisch-grid detector with a poor performance attributed to its high content of extended defects. As in the previous cases, rejecting the events significantly reduces their numbers in the continuum area, while the counts at the photopeak fall only by ~6%. As before, the original spectrum was corrected for charge trapping before rejecting ICC events.

Figure 13:
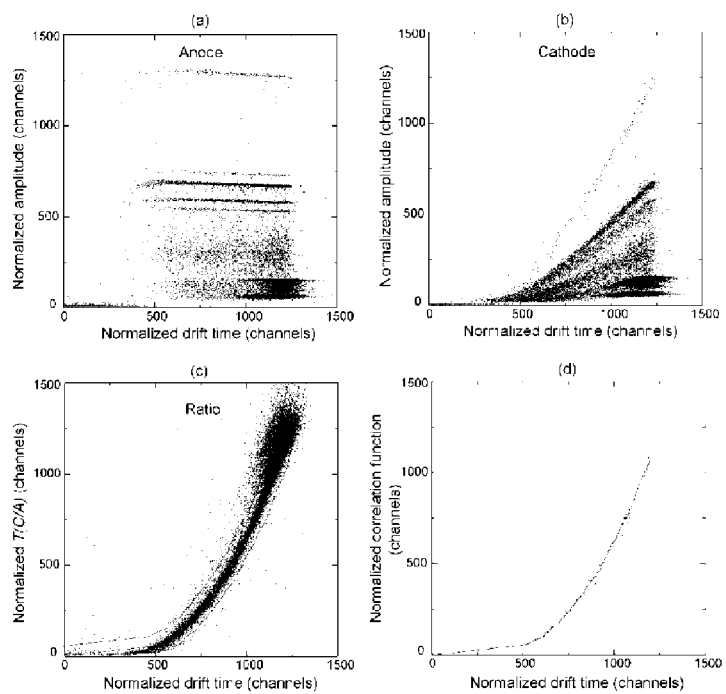
Figure 14E:
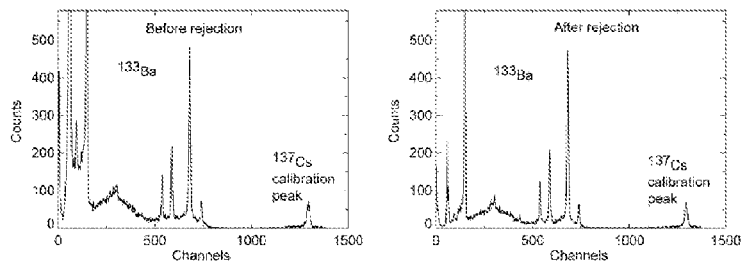

To illustrate how the algorithm works for multiple gamma-lines, measurements were carried out with a $^{133}$Ba source. A $^{137}$Cs source was superimposed to evaluate the correlation curve used for rejection. FIG. 13 shows the correlations of the signals read out from the anode and cathode, and the product of (C/A)T vs. T measured for the detector with a low content of extended defects. Similar to the distributions in FIGS. 10 and 12, the concentrations of dots correspond to the multiple gamma-lines emitted by the $^{133}$Ba source. The low-amplitude cathode signals generated by low-energy phonons, <100 keV, interacting near the cathode were not evaluated correctly. These events broaden the distributions of (C/A)T vs. T (c) in the long drift time region. Consequently, these events are mistakenly rejected, as is illustrated in FIG. 14E showing the pulse-height spectra before and after rejection. The original spectrum was corrected for charge trapping before rejecting ICC events. By using better calibrated electronics with a lower energy threshold, it would be possible to reduce the number of wrongly rejected low-energy events.

Figure 11:
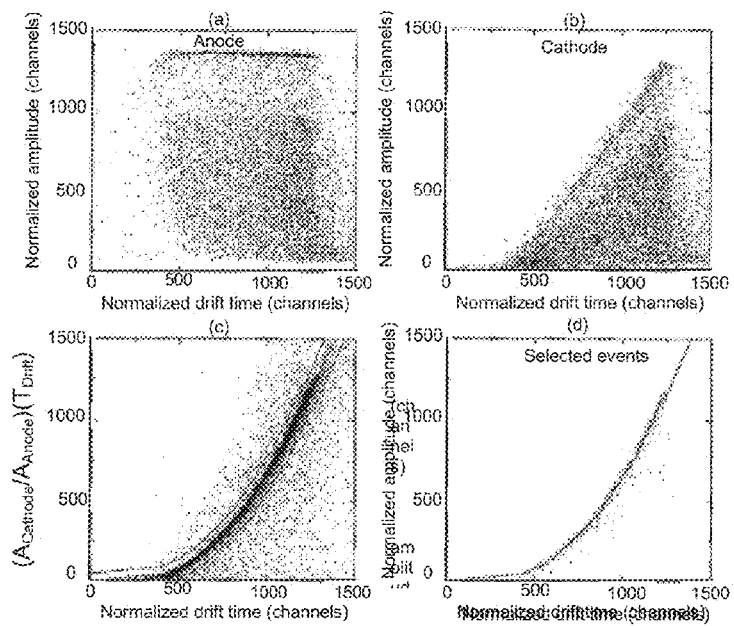

FIGS. 11 and 14B illustrate plots and pulse-height spectra for yet another example of a virtual Frisch-grid detector with slightly worse performance than that depicted in FIG. 14A.

In another version of the radiation detector device, a 6×6×15 mm$^3$ VFG detector is assembled as a 4×4 detector array. This detector provides excellent energy resolution, <1.5% FWHM at 662 keV, and large effective areas.

Although the 3D devices operating in a time-projection-chamber mode represent the most advanced technology in CZT detectors, they are not practical today for making large-effective area instruments because of the low availability and high cost of the big crystals, ~20×20×15 mm$^3$, required by this technology.

In contrast, the thick crystals, up to 20 mm, but with small cross-sectional area, ~6×6 mm$^2$, used in VFG detectors are fabricated from relatively thin, 7 mm, CZT wafers that impart better screening and greater flexibility in cutting before making the actual devices. Each bar, working as an independent detector, potentially can attain nearly intrinsic energy-resolution and high detection-efficiency.

A 4×4 array of virtual Frisch-grid detectors has a similar area and volume as a 3D detector. Both types of detectors offer correction for charge loss, imaging capability, and background rejection. The special resolution provided by the array (determined by the cross-sectional area of the bars) is suitable for using such arrays as detection planes in coded-aperture telescopes.

An energy resolution between 0.8 and 1.5%-FWHM at 662 keV can be achieved with regular spectroscopy-grade CZT material; this is about twice the resolution obtained for 3D devices, 0.6%, made from the pre-selected crystals. This resolution is adequate for resolving most gamma-ray spectra.

Because of its particular geometry, the achievable active volume of the 6×6×15 mm$^3$ virtual Frisch-grid detector is ~75% of its total volume, assuming that material is free from defects, compared with ~90% possible with 2.5-mm pitch 3D devices. In reality, detection efficiency and energy resolution characteristics are determined by the quality of CZT crystal used to fabricate the devices.

Based on results from testing over 50 virtual Frisch-grid detectors, average effective volume of the conventional quality material 6×6×15 mm³ devices is estimated 50-70% of their total volumes. However, making larger area arrays of inexpensive crystals can offset such losses in efficiency. CZT detector sensitivity is inversely proportion to the effective area and square root of the energy resolution.

Comparing VFG and 3D detectors, the latter are ~1.5 times more efficient due to their twofold better energy resolution. Nevertheless, making larger virtual Frisch-grid detectors can compensate for this drawback.

In 15 mm long detectors, a wide area near the cathode can be left uncovered by the shield without lowering the effectiveness of shielding the anode. Furthermore, assembling the arrays in which the cathodes of several detectors, i.e., the 4×4 modules, are connected together enhances the shielding effect. This design should efficiently shield the anode while permitting read-out of the cathode signals required for correcting charge losses due to electron trapping.

More than 50 6×6×15 mm³ virtual Frisch-grid detectors fabricated from two 7-mm thick CZT wafers from two different ingots have been tested. The wafers possessed a similar resistivity of >3×10¹⁰ Ohm cm, and an electron μτ-product of >7×10⁻³ cm²/V, as measured by the vendor. Later, more accurate measurements showed the μτ-products to yield a value of e>2×10⁻² cm²/V.

Characterization of the wafers was accomplished using IR transmission microscopy to measure the concentrations and size distributions of Te inclusions by taking "in depth" images of 1.1×1.5 mm² areas at different locations. Concentration of Te inclusions was within a factor of ~2 throughout the wafers' areas, except for regions containing decorated grain boundaries.

The wafers were then chemically etched to identify areas free from grain boundaries and twins, preferable regions of the crystals from which to cut the detectors. Unfortunately, this procedure does not guarantee 100% success in selecting good crystals because neither IR microscopy nor surface etching identified dislocation-related defects, such as walls of dislocation, cellular structures, low-angle boundaries, and sub-grain boundaries, all of which turned out to be very critical in determining the device performance.

Using White X-Ray Beam Diffraction Topography (WXDT), it was determined to be practically impossible to avoid wafers containing large concentrations of sub-grain boundaries and dislocation bands distributed over their entire area. Although these types of defects can be very detrimental to device performance they were purposely ignored during characterization in order to better understand their roles and to test the ability of the ICC rejection algorithm to minimize their effects. Afterwards, the wafers were returned to the vendor for making 6×6×15 mm³ detectors with two planar Platinum (Pt) contacts.

The crystals were tested as-received for leakage current, and then encapsulated in ultra-thin polyester shells. To complete the device, 5.0-5.5 mm-wide shielding electrodes made of the aluminum foil were placed near the anode electrodes, as shown in FIG. 2B, this is optimal for 6×6×15 mm³ crystals.

During the testing, the detector was placed inside a special holder with two BNC connectors (FIG. 2D). This arrangement allowed application of a high-voltage bias on the cathode and to read the signals from both the cathode and anode. The test sources were sited about ~7 cm above the detector to keep the count rate sufficiently low to eliminate overlapping pulses. A 2000-V bias was applied to the cathode.

A LeCroy Waverunner was used to digitize and record the output signals (waveforms) readout with the eV-Microelectronics charge-sensitive preamplifiers (eV-5093) from the anode and cathode. A digital-pulse analysis method described in reference "Performance Studies of CdZnTe Detector by Using a Pulse-Shape Analysis," Proceedings of SPIE Hard X-Ray and Gamma-Ray Detector Physics VII, 59200K1-59200K-12 (2005), by Bolotnikov, et al., which is herein incorporated in entirety by reference, was used to evaluate the pulse-height spectra and the dependencies of the signals' amplitudes versus the electrons' drift-times.

Figure 15:
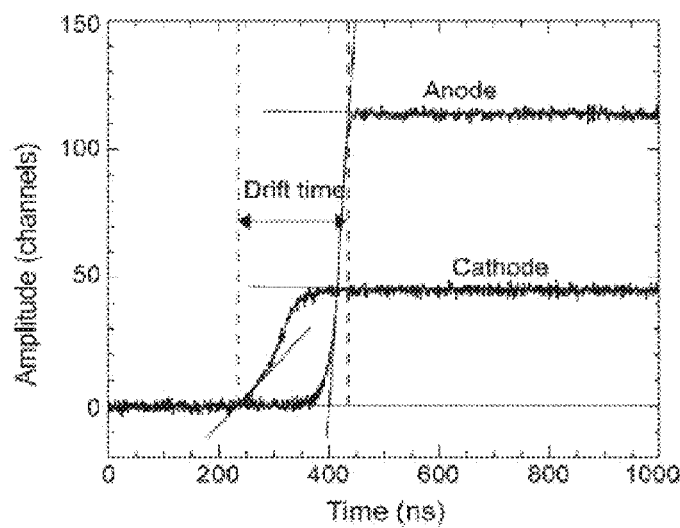
FIG. 15 is a plot of typical signals captured from the cathode and anode. Two vertical ones define the interaction time (left), and electron arrival time at the anode (right). The drift time is determined as the interval between these two moments.

FIG. 15 shows typical signals captured from the cathode- and anode-contact. The horizontal dashed line defines a threshold for the cathode signal, while the vertical dashed ones define the event-accruing time (left), and the electron arrival time at the anode (right). The drift time is determined as the time between these two moments. Amplitudes of the anode- and cathode-signals were evaluated by averaging the corresponding top, flat portion of the pulses over ~500 ns after the baseline subtraction. A set of at least 20,000 waveforms was gathered, and used to evaluate the dependence on the amplitudes of the output signals measured from the anode and cathode versus the drift-time and pulse-height spectra.

Based on a series of measurements of pulse-height spectra and the dependences of the amplitude of the anode and cathode signals versus the electron drift time (correlation curves) from a 6×6×15 mm³ virtual Frisch-grid detector equipped with shielding electrodes of different widths, it is possible to reduce the width of the shielding electrode so that it covers only ~5 mm of the detector length without affecting device performance.

Figure 16A:
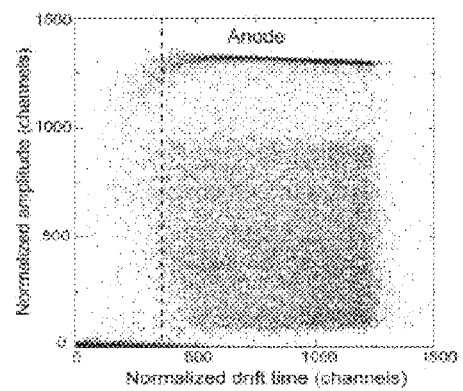
FIG. 16A is a plot showing a dependence of the anode signal vs. the drift time (correlation curves) measured for a good 6×6×15 mm³ virtual. Frisch-grid detector with a 5-mm wide shielding electrode placed near the anode.
Figure 16B:
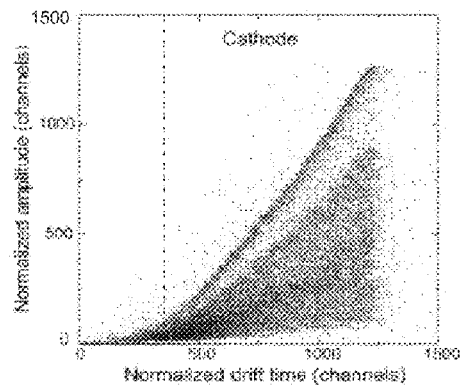
FIG. 16B is a plot showing a dependence of the cathode signal vs. the drift time (correlation curves) measured for a good 6×6×15 mm³ virtual Frisch-grid detector with a 5-mm wide shielding electrode placed near the anode.

Out of 50 fabricated detectors, twelve had excessively high leakage currents (likely related to the network of sub-grain boundaries network that shortened the cathode and the anode), and could not be used. FIGS. 16A and 16B plots the typical dependences of the anode- and cathode-signals versus the drift time measured for a representative detector with a 5-mm wide shielding electrode. Since the drift times correspond to the distances of the electron clouds from the anode, these dependencies represent correlations between the output signals and the interaction depth. Each dot in these distributions represents an event that the device detected.

The full-energy absorption events are concentrated along the curved lines whose shapes are determined by changes of the weighting potential inside the device, and by electron loss due to trapping. For the anode signals, over most of the device (except for the region near the anode) these two effects, approximated by linear functions with opposite slopes, partially compensate for each other, generating a nearly flat response. As is evident, the response rapidly declines below a certain distance from the anode.

Analogous to the classic gas-ionization chamber, in the Frisch-grid this distance can be marked as a location of the virtual Frisch-grid (shown as a vertical dashed line). For the cathode signals, a close-to-linearly rising function in the distance interval between the virtual Frisch-grid and the cathode approximates signal dependence. The slope of the anode dependence is used to correct charge losses due to trapping.

Figure 17:
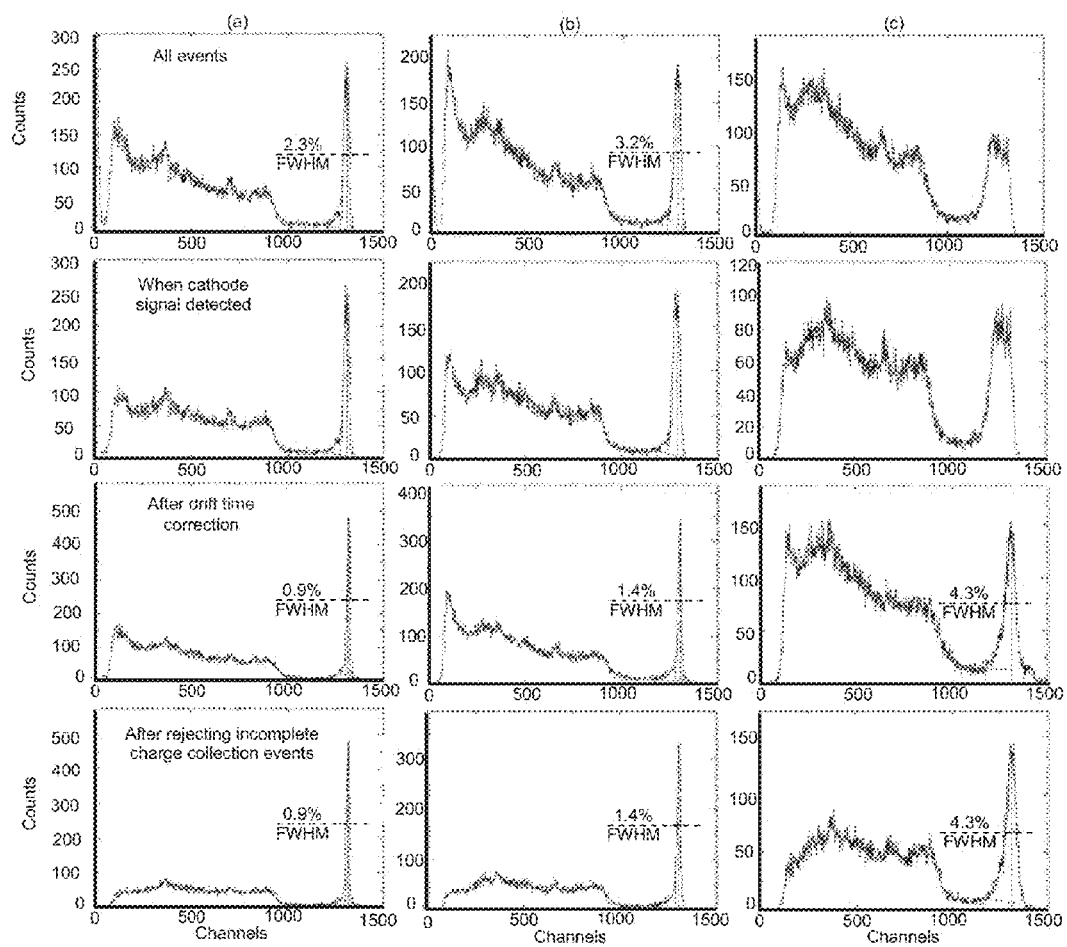
FIG. 17 are twelve pulse-height spectra generated after each step of pulse processing from three representative detectors: (a) good, (b) average; and, (c) poor.

For each interaction, events triggered by the cathode the anode- and cathode-signals are processed to evaluate the corresponding pulse-heights, and the drift times that, in turn, are used to generate and correct the pulse-height spectra. FIG. 17 depicts the pulse-height spectra generated after each step of pulse processing from three representative detectors: (a) good, (b) average, and (c) poor.

The top row of each of three columns in FIG. 17 represents the original all-events spectra (regardless of the cathode signals) measured from the detectors. The spectra in the second row contain only those events for which the cathode signals exceeded one sigma above the noise level. As is evident, these spectra have notably smaller low-energy continuums, mostly populated by the events interacting near the anode, while the photopeaks remain intact. The third row shows the spectra after applying the drift-time correction that uses the slopes of the correlation curves like that shown in FIG. 16A.

Clearly, such corrections improve the devices' energy resolution without events losses. Finally, the last row (bottom) shows the corrected spectra after rejecting the incomplete charge-collection events. This procedure cleaned up the spectra by removing them from the continuum while retaining the true Compton scattering events and all original photopeak events.

The virtual Frisch-grid detector offers a way to veto the majority of the ICC events resulting from these defects. The application of the rejection technique for spectral responses generated by the $^{137}$Cs source has been illustrated above (FIG. 17).

Figure 18:
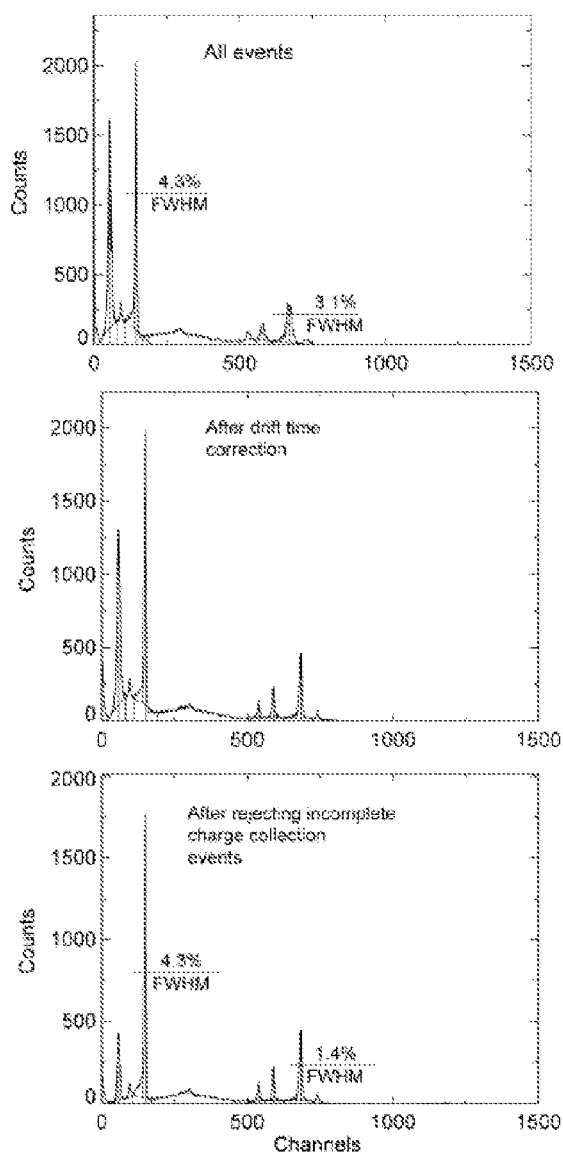
FIG. 18 is showing pulse-height spectra generated after each step of pulse processing from a good detector illuminated with a $^{133}$Ba source.
Figure 19A:
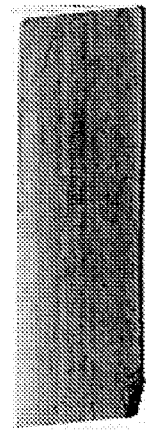
FIGS. 19A-19D are pulse-height spectra before (top) and after (bottom) corrections taken with detectors of different qualities: detectors (FIG. 19A) and (FIG. 19D) have small concentrations of extended defects, while the detectors (FIG. 19B) and (FIG. 19C) have high concentrations. A WXDT topograph is shown next to each spectra for a given detector.
Figure 19A:
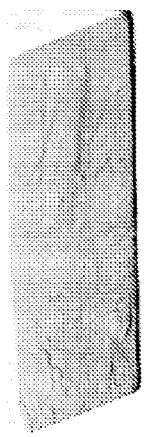
Figure 19A:
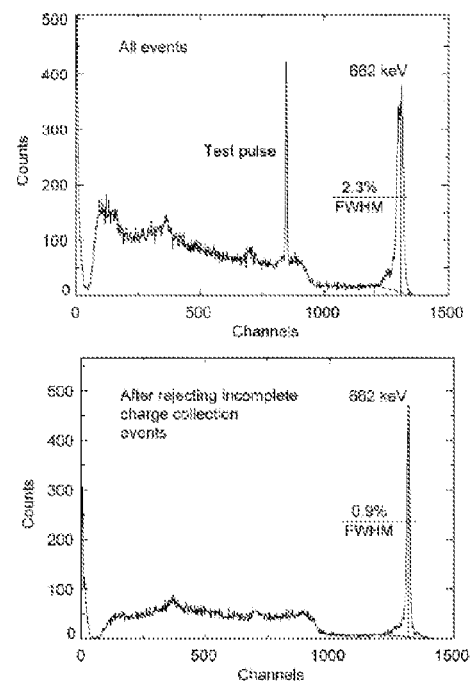
Figure 19B:
Figure 19B:
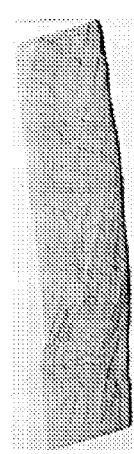
Figure 19B:
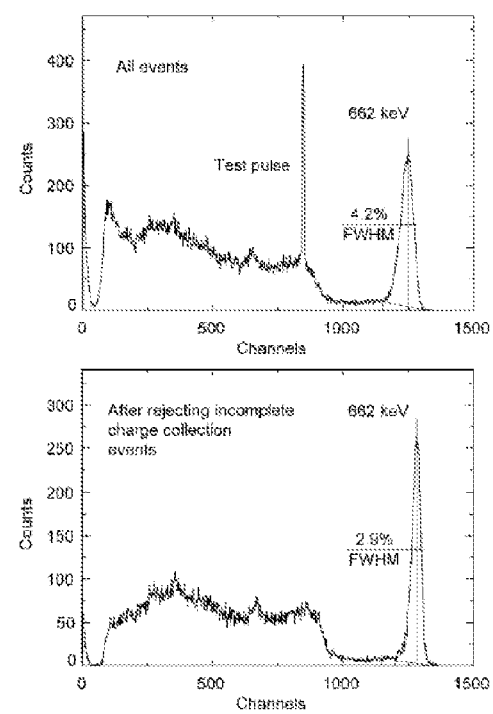
Figure 19C:
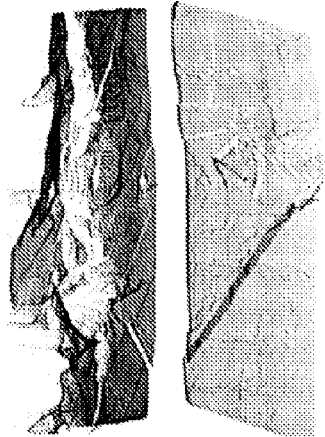
Figure 19C:
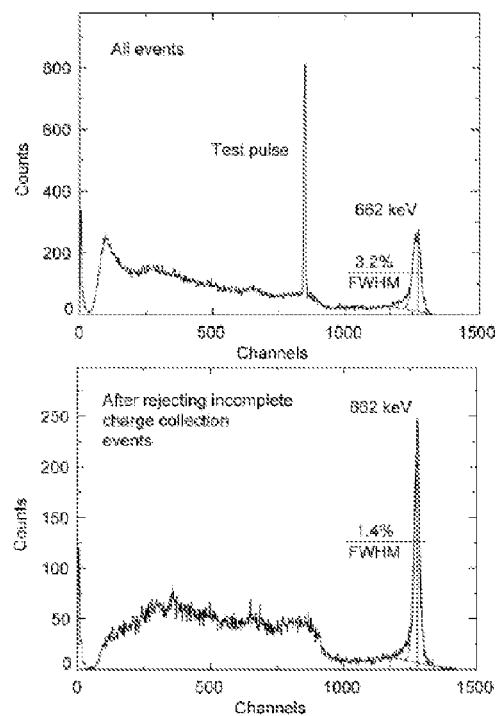
Figure 19D:
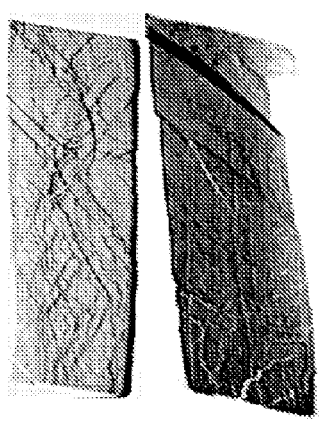
Figure 19D:
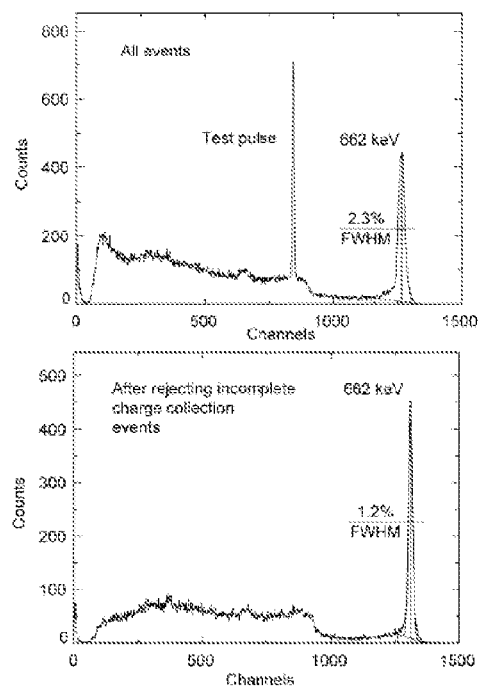

To demonstrate that this technique is applicable to improving the pulse-height spectra generated by multiple gamma-lines, a $^{133}$Ba source was used to illuminate the detector. FIG. 18 shows the spectra generated after each step of pulse processing for the good detector.

Factors Limiting Energy Resolution

The virtual Frisch-grid detectors potentially can provide the statistic-limited resolution. However, the electronic noise is inherently higher in these types of detectors compared to pixel devices because of the anode's higher capacitance. The best energy resolution (after correcting for charge loss) measured with a 6×6×15 mm$^3$ virtual Frisch-grid detectors was 0.8% FWHM and 662 keV at room temperature. After subtracting the contribution of electronic noise, ~3.5 keV a value of 0.6% was estimated, very close to the statistical limit. The averaged energy resolution measured for all detectors was ~1.3%. Degradation of the energy resolution in many of the detectors tested was attributed to defects in the CZT crystals, describe below in their order of the importance.

FIGS. 19A-19D show examples of pulse-height spectra (original and after correction and ICC rejection) measured with several representative detectors fabricated from the CZT crystals with different contents of the dislocation-related defects, as revealed with WXDT. These figures also illustrate that, in many cases, the pulse-height spectra can be significantly improved by using the drift-time correction- and ICC rejection-techniques. The original (all events) and corrected spectra (after both such modifications) are shown on the top and at bottom, correspondently. The image on the left is a WXDT topograph taken for the two orthogonal sides of the detector.

For the majority of the crystals, an energy resolution ranging from 0.8% to 2% FWHM at 662 keV was achieved, after charge-loss correction using cathode signals. It has been demonstrated that rejecting incomplete charge-collection events improves pulse-height spectra, thereby allowing the use of crystals with defects that are less expensive than good ones, and have high availability.

The device's performance was primarily limited by dislocation-related defects: The walls of dislocations, low-angle and sub-grain boundaries, and, sometimes, cellular structures. These defects are located only by X-ray diffraction topography. To overcome these problems, more uniform ingots must be grown.

Various modifications and variations of the described detector(s) and its components will be apparent to those skilled in the art without departing from the scope and spirit of the invention. Although the disclosure has been described in connection with specific preferred embodiments, it should be understood that the invention as claimed should not be unduly limited to such specific embodiments. Indeed, those skilled in the art will recognize, or be able to ascertain using no more than routine experimentation, many equivalents to the specific embodiments of the invention described herein. Such equivalents are intended to be encompassed by the following claims.

What is claimed is:

1. A radiation detector device, comprising:
    at least one radiation detector element configured to generate electrical charges in response to radiation interacting with a radiation detector material;
    at least one anode connected to the at least one radiation detector element and configured to output electrical signals from the radiation detector material corresponding to generated electrical charges;
    at least one shared cathode connected to one or more of the at least one radiation detector elements and configured to output electrical signals from the radiation detector material corresponding to generated electrical charges;
    a specialized radiation detector chip (SRDC) connected to the at least one anode and connected to the at least one shared cathode, wherein the SRDC is configured to receive the electrical signals, sense parameters of the received electrical signals, and output the sensed electrical signal parameters;
    a non-transitory computer readable storage medium storing a full charge collection (FCC) event correlation function and instructions for performing a correlation value comparison algorithm utilizing the FCC event correlation function as a reference curve to determine whether correlation values calculated for the sensed electrical signal parameters fit a FCC event correlation function profile; and
    a processor connected to the non-transitory computer readable storage medium and connected to the SRDC, wherein the processor is configured to receive the sensed electrical signal parameters, calculate correlation values for the sensed electrical signal parameters, and execute the instructions for performing the correlation value comparison algorithm.

2. The radiation detector device of claim 1, wherein a portion of one or more of the at least one radiation detector elements is surrounded by a shielding electrode.

3. The radiation detector device of claim 1, wherein the at least one anode is mounted on a substrate, including a ceramic substrate or other appropriate substrate, connected to a circuit board.

4. The radiation detector device of claim 1, wherein the detector material comprises a semiconductor.

5. The radiation detector device of claim 4, wherein the semiconductor includes multiple different semiconductor materials or compounds.

6. The radiation detector device of claim 4, wherein the semiconductor includes silicon (Si), germanium (Ge), silicon-germanium ($Si_{1-x}Ge_x$, wherein x is greater than 0 and less than 1), silicon carbide (SiC), cadmium telluride (CdTe), or cadmium zinc telluride ($Cd_{1-x}Zn_xTe$, wherein x is greater than 0 and less than 1).

7. The radiation detector device of claim 4, wherein the semiconductor includes CdMnTe, $HgI_2$, TlBr, HgCdTe, HgZnSe, GaAs, $PbI_2$, AlSb, InP, ZnSe, ZnTe, PbO, $BiI_3$, SiC, $Hg_xBr_{1-x}$, $I_2$, $Hg_xCd_{1-x}I_2$, wherein x is greater than 0 and less than 1, $InI_2$, $Ga_2Se_3$, $Ga_2Te_3$, $TlPbI_3$, $Tl_4HgI_6$, $Tl_3As_2Se_3$, $TlGaSe_2$, or $AgGaTe_2$.

8. The radiation detector device of claim 1, wherein the detector material comprises a doped semiconductor.

9. The radiation detector device of claim 1, wherein the detector material comprises a metallic element.

10. The radiation detector device of claim 1, wherein the detector material comprises a liquid or gas.

11. The radiation detector device of claim 10, wherein the detector material includes Xe, Ar, or Kr.

12. The radiation detector device of claim 1, wherein the at least one radiation detector includes a plurality of radiation detector elements configured in an array.

13. The radiation detector device of claim 1, wherein the at least one radiation detector element detects ionizing radiation.

14. The radiation detector device of claim 1, wherein the at least one radiation detector element detects electromagnetic radiation.

15. The radiation detector device of claim 14, wherein the at least one radiation detector element detects high-energy electromagnetic radiation, including ultraviolet, X-ray, and gamma-ray energy frequencies.

16. The radiation detector device of claim 1, wherein the at least one radiation detector element detects charged particle radiation, including protons, electrons, alpha particle, beta particle, and ion particle radiation.

17. The radiation detector device of claim 1, wherein the at least one radiation detector element detects neutral particle radiation, including neutron radiation and neutral atomic particle radiation.

18. The radiation detector device of claim 1, wherein the processor is contained within the SRDC.

19. The radiation detector device of claim 1, wherein the processor is configured to control the SRDC.

20. The radiation detector device of claim 1, wherein calculation of correlation values by the processor for the sensed electrical signal parameters is based on a weighting potential function for $\phi_0$ as determined by solving the Laplace equation for the particular device geometry and configuration.

21. The radiation detector device of claim 20, wherein the Laplace equation is solved with the following artificial boundary conditions:
    voltage on the electrode of interest is set at unity;
    voltages on all other electrodes are set at zero; and
    any trapped charges inside the detector volume are ignored.

22. The radiation detector device of claim 20, wherein the radiation detector device configuration includes pixel-, coplanar grid- (CPG), semi-spherical, CAPture, or any configuration designed to operate in the virtual Frisch-grid- (VFG) mode.

23. The radiation detector device of claim 1, wherein the FCC event correlation function is pre-loaded in the non-transitory computer readable storage medium.

24. The radiation detector device of claim 1, wherein the FCC event correlation function has been calibrated using one or more known radiation sources.

25. The radiation detector device of claim 1, wherein the parameters of the electrical signals sensed by the SRDC include amplitude and timing parameters.

26. The radiation detector device of claim 25, wherein the FCC event correlation function describes a statistically averaged reference curve relating ratios of FCC event cathode electrical signal amplitudes to FCC event anode electrical signal amplitudes and a timing parameter, including electron cloud drift times.

27. The radiation detector device of claim 26, wherein the calculated correlation values for the sensed electrical signal parameters that occur along the reference curve of the FCC event correlation function within a narrow band representative of electronic noise are determined to correspond to FCC events.

28. The radiation detector device of claim 26, wherein the calculated correlation values for the sensed electrical signal parameters that occur outside a narrow band representative of electronic noise with respect to the reference curve of the FCC event correlation function are determined to correspond to Incomplete Charge Collection (ICC) events.

29. The radiation detector device of claim 25, wherein a result of the correlation value comparison algorithm distinguishes between FCC events and ICC events.

30. The radiation detector device of claim 29, wherein the correlation value comprises a ratio calculated by relating the at least one shared cathode electrical signal amplitude to the electrical signal amplitude from the at least one anode and a sensed timing parameter, including electron cloud drift time.

31. The radiation detector device of claim 29, wherein a further result of the correlation value comparison algorithm includes rejection of electrical signal events determined to correspond to ICC events.

32. The radiation detector device of claim 31, wherein rejection of electrical signal events determined to correspond to ICC events results in exclusion of those ICC events from radiation detector spectral analyses.

33. The radiation detector device of claim 31, wherein the processor evaluates a radiation detector performance factor based on a ratio of an average of FCC event electrical signal energy spectra to an average of electrical signal energy spectra associated with both FCC and ICC events.

34. A method of evaluating charge collection events in a radiation detector device, the method including:
    generating electrical charges in at least one radiation detector element in response to radiation interacting with a detector material;
    outputting electrical signals corresponding to the generated electrical charges from the at least one radiation detector element by at least one anode connected to the at least one radiation detector element;
    outputting electrical signals corresponding to the generated electrical charges from the at least one radiation detector element by at least one shared cathode connected to one or more of the at least one radiation detector elements;
    receiving the electrical signals by a specialized radiation detector chip (SRDC) connected to the at least one anode and connected to the at least one shared cathode;
    sensing parameters of the received electrical signals by the SRDC;
    outputting the sensed electrical signal parameters by the SRDC;
    receiving at a processor connected to the SRDC the sensed electrical signal parameters;
    calculating by the processor correlation values for the sensed electrical signal parameters; and
    executing by the processor, based on instructions for performing a correlation value comparison algorithm and a full charge collection (FCC) event correlation function stored in a non-transitory computer readable storage medium connected to the processor, the correlation value comparison algorithm utilizing the FCC event correlation function as a reference curve to determine whether the correlation values fit a FCC event correlation function profile.

35. The method of claim 34, further including:
    generating electrical signal energy spectra for the electrical signal parameters sensed by the SRDC; and saving the electrical signal energy spectra in the non-transitory computer readable medium.

36. The method of claim 34, further including:
pre-loading the non-transitory computer readable storage medium with the instructions for performing the correlation value comparison algorithm.

37. The method of claim 34, wherein the FCC event correlation function has been calibrated using one or more known radiation sources.

38. The method of claim 34, further including:
determining radiation detection events to correspond to FCC events when correlation values occur along the curve of the FCC correlation function within a narrow band representative of electronic noise; and
determining radiation detection events to correspond to ICC events when correlation values occur outside the narrow band representative of electronic noise.

39. The method of claim 34, wherein the parameters of the electrical signals sensed by the SRDC include amplitude and timing parameters.

40. The method of claim 39, further including:
pre-loading the non-transitory computer readable storage medium with the full charge collection (FCC) event correlation function which describes a statistically averaged reference curve relating ratios of FCC event cathode electrical signal amplitudes to FCC event anode electrical signal amplitudes and a timing parameter, including electron cloud drift times.

41. The method of claim 39, wherein executing the correlation value comparison algorithm includes the steps of:
calculating electron cloud drift time based on electrical signal parameters sensed by the SRDC;
calculating a correlation value based on the electrical signal parameters that relates a ratio of the electrical signal from the at least one shared cathode to the electrical signal from the at least one anode and a timing parameter, including the calculated electron cloud drift time;
comparing the correlation value to a full charge collection (FCC) event correlation function; and
distinguishing between full charge collection (FCC) events and incomplete charge collection (ICC) events based on a result of the comparison of the correlation value to the full charge collection (FCC) event correlation function.

42. The method of claim 41, wherein distinguishing between FCC events and ICC events is based on a correlation value calculated for the measured electrical signal parameters that relates a ratio of the amplitude of the electrical signal from the at least one shared cathode to the amplitude of the electrical signal from the at least one anode and the calculated electron cloud drift time.

43. The method of claim 41, wherein calculating the correlation value for the electrical signal parameters relates the ratio of the amplitude of the electrical signal of the at least one shared cathode to the combined amplitude of the electrical signals from one or more of the at least one anodes and the calculated electron cloud drift time.

44. The method of claim 41, wherein executing the correlation value comparison algorithm includes the step of:
rejecting electrical signal events distinguished as ICC events from inclusion in radiation detector spectral analyses.

45. The method of claim 41, further including:
generating electrical signal energy spectra for the electrical signal parameters associated with FCC events; and
saving the electrical signal energy spectra associated with FCC events.

46. The method of claim 45, further including:
generating electrical signal energy spectra for the electrical signal parameters associated with ICC events; and
saving the electrical signal energy spectra associated with ICC events.

47. The method of claim 46, further including:
providing an evaluation of a radiation detector performance factor based on a ratio of an average of saved FCC event electrical signal energy spectra to an average of saved electrical signal energy spectra associated with both FCC and rejected ICC events.

* * * * *